United States Patent [19]
Manhart et al.

[11] Patent Number: 5,617,252
[45] Date of Patent: Apr. 1, 1997

[54] GRADIENT REFRACTIVE INDEX LENS ELEMENTS

[75] Inventors: Paul K. Manhart; Tilman W. Stuhlinger; Kenneth R. Castle; Mitchell C. Ruda, all of Tucson, Ariz.

[73] Assignee: Lightpath Technologies Inc., Albuquerque, N.M.

[21] Appl. No.: 513,250

[22] Filed: Aug. 10, 1995

Related U.S. Application Data

[63] Continuation of Ser. No. 93,434, Jul. 16, 1993, abandoned.
[51] Int. Cl.⁶ .................................................. G02B 3/00
[52] U.S. Cl. ............................................................ 359/653
[58] Field of Search ...................................... 359/653, 652

[56] References Cited

U.S. PATENT DOCUMENTS

| | | | |
|---|---|---|---|
| 4,758,071 | 7/1988 | McLaughlin et al. | 359/653 |
| 4,810,070 | 3/1989 | Suda et al. | 350/413 |
| 4,852,981 | 8/1989 | Suda | 350/413 |
| 4,929,065 | 5/1990 | Hagerty et al. | 350/413 |
| 5,044,737 | 9/1991 | Blankenbecler | 350/413 |
| 5,050,970 | 9/1991 | Kittaka | 359/653 |
| 5,239,413 | 8/1993 | Kawano | 359/653 |

OTHER PUBLICATIONS

"Gradients and their applications", B. D. Guenther SPIE vol. 935 pp. 95–104 (1988).
"Recent Progress in Gradient–Index Optics", S Houde–Walter, SPIE vol. 935 pp. 2–24 (1988).
"Third Order Aberrations of Inhomogeneous Lenses", P. J. Sands J. Opt. Soc. Am. 60, 11, pp. 1436–1443 Sep. 1970.
"The Control of Gradient Index Profile for Gradient Index Glasses of Macro Size and Large Δn for a Varifocal Slide Projector Lens", (SPIE Publication), Xu et al.
"Inhomogeneous Lenses IV Aberrations of Lenses with Axial Index Dimensions", P. J. Sands J. Opt. Soc. Am 61, 8, pp. 1086–1091 Aug. 1971.
"Progress in Gradient Index Glasses of Macro Dimensions and Large Δn" Blakenbecler et al. OSA GRIN Conference Spain 1992.

*Primary Examiner*—Scott J. Sugarman
*Attorney, Agent, or Firm*—R. Russel Austin

[57] ABSTRACT

A lens element (40) is formed from a monolithic unit (46) having two sections (46A and 46B) aligned on an optical axis. A selected one of the sections has an axial gradient refractive index, and the other has a homogeneous refractive index. A first surface 42 is generated one section and a second surface is generated on the other. The axial gradient index material may be selected such that third order spherical aberration of the element is zero. The axial gradient index material may be selected such that similarly constructed elements having shape factors between about 0 and 2.0 also have zero third order spherical aberration. Another element (20) may be formed entirely from an axially graded refractive index material. The refractive index preferably varies as a non-linear function of at least distance along the optical axis. The refractive index function and index change may be selected such that a selected third order aberration is zero or some constant value over a wide range of shape factor. An element (98) is formed from a material having an axial gradient dispersion. Shape factor and dispersion gradient may be selected such that the element is achromatic.

10 Claims, 16 Drawing Sheets

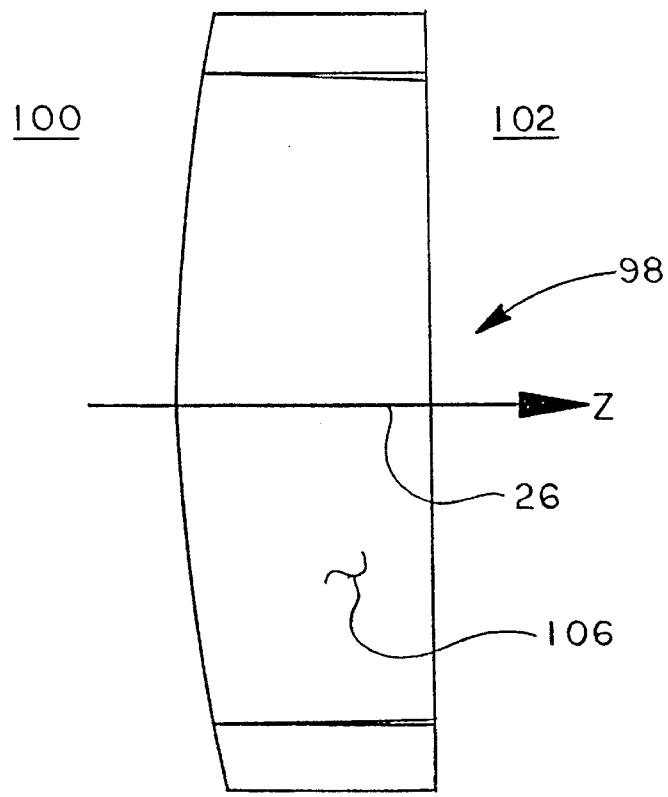
FIG. 16
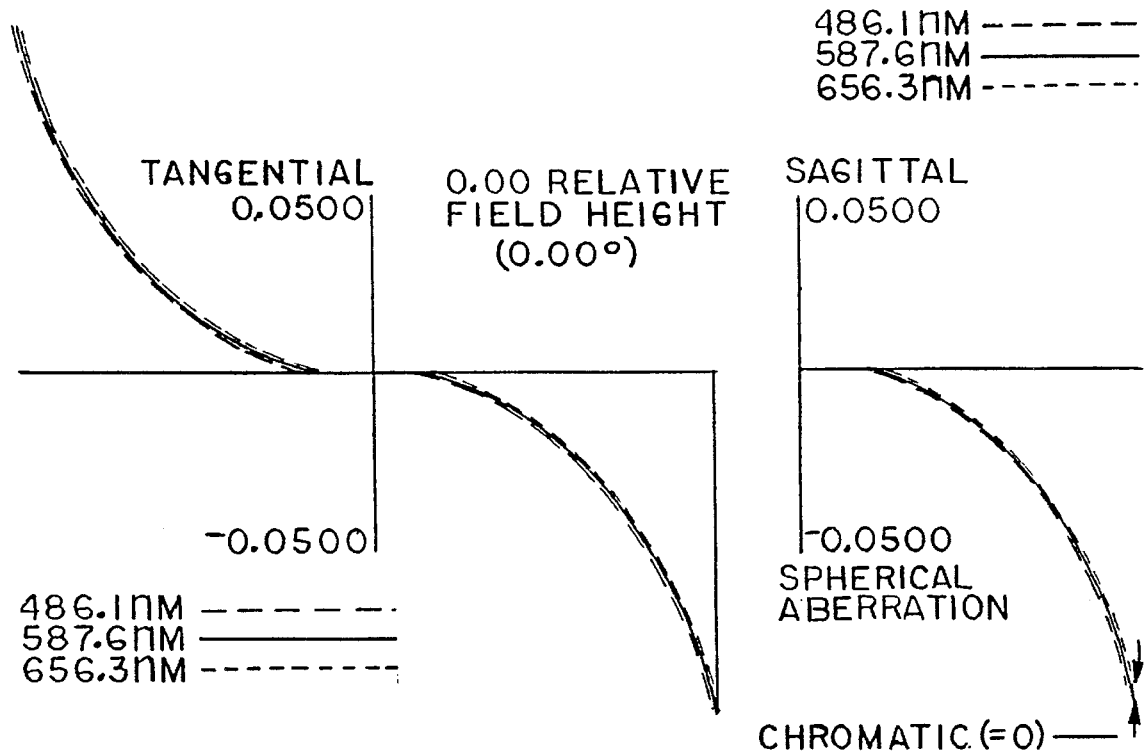
FIG. 17A
FIG. 17B

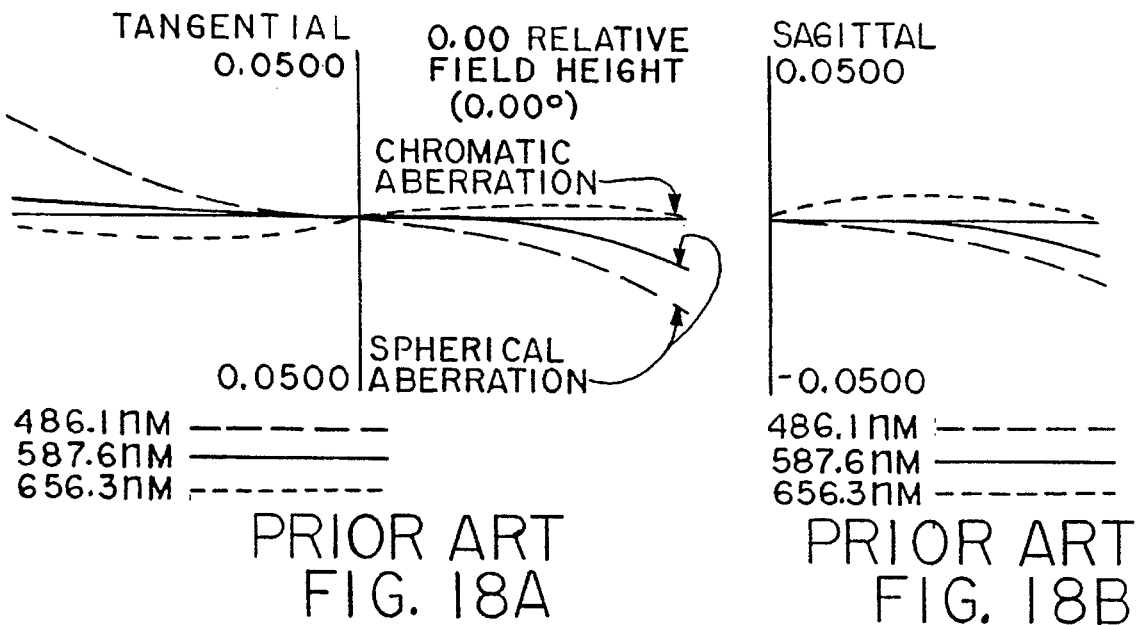
PRIOR ART
FIG. 18A
PRIOR ART
FIG. 18B
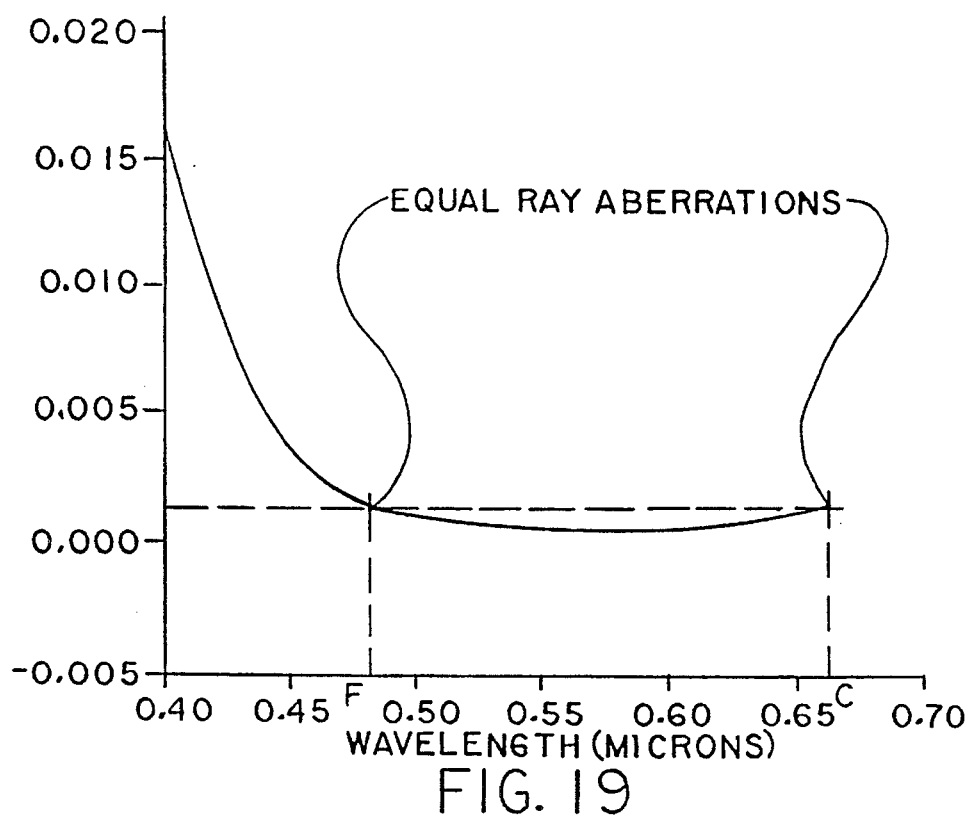
FIG. 19

GRADIENT REFRACTIVE INDEX LENS ELEMENTS

This is a continuation of application Ser. No. 08/093,434 filed Jul. 16, 1993, now abandoned.

TECHNICAL FIELD

The present invention relates in general to lens elements. It relates in particular to a lens element made from an optically transparent lens blank, all or part of which has a gradient refractive index.

BACKGROUND ART

It is generally accepted, that incorporating one or more unconventional refractive optical elements in a multi-element lens or optical system may improve performance, reduce element count, or both.

The unconventional elements most often relied on by optical system and lens designers are elements having an aspheric surface. Many of the earliest computer codes used for optical system and lens design were capable of dealing with aspheric surfaces. For several years now, it has been possible to generate aspheric surfaces, relatively inexpensively, on plastic materials. In recent years, fabrication techniques have been developed which permit such aspheric surfaces to be generated on certain optical glasses.

It is also believed that optical elements made from gradient refractive index (GRIN) transparent materials may be effective in improving optical system performance or reducing element count. However, systems employing the gradient index elements, have, heretofore, remained essentially conceptual. It may be said that the idea of using such elements has been less than enthusiastically endorsed by practitioners of the lens design art.

There may be several reasons for this. Optical design codes capable of dealing with gradient index materials, at any level, have not, until relatively recently, been commercially available. Gradient index materials were originally prepared by applying surface treatments to homogeneous materials. Such treatments include chemical immersion, ion implantation and the like. Such methods of preparation are generally not capable of providing a wide range of index values in a material, or providing a material which is actually thick enough to make a practical lens blank. It is widely believed that GRIN optical elements would be most effective if the refractive index gradient of the glass varied radially, i.e., in a direction perpendicular to the element's optical axis. An axial gradient material, in which refractive index varies with distance along an element's optical axis, is generally believed not to offer any benefit that could not be achieved by an aspheric element.

It is very difficult to produce a radial gradient material on a practically useful scale, and at an acceptable cost. An axial gradient index material, on the other hand, may now be readily produced.

In U.S. Pat. No. 4,929,065 (Hagerty et al.), the disclosure of which is hereby incorporated by reference, a technique is described that allows the fabrication of lens blanks having an index gradient varying in a direction parallel to the optical axis of a lens element. A series of thin glass plates, each of a slightly different refractive index, is stacked together and heated to a predetermined temperature. At this temperature, the plates fuse together, and adjacent plates inter-diffuse. Because of the inter-diffusion of adjacent plates, a transparent medium having a continuously and smoothly varying refractive index is produced. The technique has been developed and refined to the point where glass blanks having refractive index variations greater that about 0.4, for example, from 1.52 to 1.95, may be produced in a range of practical diameter and thickness.

Returning now to optical design aspects, in prior art documents, GRIN elements are generally discussed as part of an optical system including one or more homogenous elements. The GRIN property in such cases is considered as providing no more than an additional degree of freedom for an optical designer. System optimization often involves merely a trial-and-error approach, which, unfortunately, is encouraged by the power, speed and availability of modern computers. Because of this, it is often difficult to determine precisely the exact contribution of a GRIN element to the system performance. It is probable that, by considering GRIN elements in this way, the full potential of GRIN elements is not being realized.

A spherical refractive optical element has all common optical aberrations, to some degree, depending on its actual shape and material. To reduce or eliminate a particular aberration, spherical elements are usually combined in groups of two or more. This has led over the years to well known basic element groups as the Cooke triplet, for correcting third order aberrations; the double Gauss system which uses symmetrical element groups to provide low coma, and thick meniscus elements to reduce astigmatism and field curvature; and several doublet groups for providing low chromatic distortion.

Often, in an optical system involving a group of spherical elements, if the shape of one element is varied to improve a particular aberration in the system, another aberration property of the group is affected. This aberration must be corrected by altering one or more other elements.

It would be useful for optical designers if a GRIN material could be formulated that would allow a single lens element to be produced in a wide variety of shapes while still having at least one selected aberration be essentially zero, or, if not zero, at least some substantially constant value. It would be particularly useful if such a GRIN material could be formulated from an axial GRIN material made by the above referenced technique of Hagerty et al..

This would offer the immediate possibility of using a GRIN element, in a system of optical elements, to correct a selected system aberration, without perturbing another system aberration which had been already adequately corrected. In effect, such a GRIN element could be as standard an optical building-block as any of the well-known conventional multi-element groups are at present.

It is believed that formulation of such GRIN elements may lead to more effective reduction in system element count than is presently believed possible. In certain monochromatic systems, such an element may well be used to replace a system of two or more elements with a single element having merely spherical surfaces.

The present invention is directed to providing such GRIN elements.

SUMMARY OF THE INVENTION

In one aspect of the present invention, a gradient refractive index lens element comprises first and second surfaces formed on respectively first and second sections of a transparent monolithic unit. The first and second surfaces are generally arranged on a common optical axis.

A selected one of the first and second sections has a gradient refractive index varying in a direction parallel to the optical axis. The other section has a substantially homogeneous refractive index. The gradient and homogeneous refractive indices have substantially the same value at any location on a junction between the first and second sections.

The lens element has a shape-factor, X, defined by an equation $$X = (R2 + R1)/(R2 - R1) \qquad (1)$$

where R1 is the radius of curvature of the first surface and R2 is the radius of curvature of the second surface.

The gradient refractive index may be selected such that at least one third order aberration selected from the group consisting of spherical, coma, and astigmatism is about zero for at least one value of the shape-factor.

In a preferred embodiment, the gradient refractive index may be selected such that third order spherical aberration is substantially eliminated for positive values of shape-factor between about 0.0 and 2.0. Third order spherical aberration is substantially eliminated at all values of shape-factor between −2.0 and 2.0.

In another aspect of the present invention, first and second surfaces are formed on an optically transparent material having a gradient refractive index. The first and second surfaces are generally arranged on a common optical axis.

The gradient refractive index varies according to a predetermined non-linear function of distance measured in a direction parallel to the optical axis.

The non-linear function may be a cubic or a quadratic function varying only in an axial direction. Alternatively, the function may be a linear or non-linear function, varying in a radial as well as an axial direction.

The index gradient function may be selected such that at least one third order aberration selected from the group consisting of spherical, coma, and astigmatism may be either zero or some substantially constant value over a range of shape-factors, for a fixed value of index change.

In one preferred embodiment, the gradient refractive index function is a cubic function selected such that third order spherical aberration is substantially eliminated for positive shape-factors between about 0.5 and 2.0 for an index-change value of about −0.2.

In yet another aspect of the present invention first and second surfaces are formed on an optically transparent material having a gradient refractive index. The first and second surfaces are generally arranged on a common optical axis. A refractive index gradient function may be selected such that a selected third order aberration is invariant with refractive index change at about one shape-factor. This is termed a pivot-point. A pivot-point for a selected aberration may be created at any shape-factor in the range between about −2.0 and 2.0.

In yet another, non-exhaustive aspect of the present invention, first and second surfaces are formed on an optically transparent material having a gradient optical dispersion. The first and second surfaces are generally arranged on a common optical axis.

The gradient dispersion material has a dispersion gradient characterized by a dispersion varying in a direction parallel to the optical axis.

The shape-factor of the lens element provides a first axial chromatic aberration for red and blue light passing through the lens element. The dispersion gradient provides a second axial chromatic aberration for red and blue light passing through the lens element.

The shape-factor and the dispersion gradient may be selected such that the first and second chromatic aberrations for red and blue light are equal in magnitude to each other, but opposite in sign, thereby correcting chromatic aberration and providing an achromatic lens element.

This chromatic aberration correction mechanism is independent of the base refractive index of the transparent optically inhomogeneous material. The base refractive index may itself be inhomogeneous. Because of this, the possibility exists that a gradient index material having appropriate dispersion gradient properties may be used to provide an element which is corrected for both chromatic aberration and at least one third order aberration.

DESCRIPTION OF THE DRAWINGS

The accompanying drawings, which are incorporated in and constitute a part of the specification, schematically illustrate a preferred embodiment of the invention and, together with the general description given above and the detailed description of preferred embodiments given below, serve to explain the principles of the invention.

FIG. 16 schematically illustrates an achromatic, gradient dispersion, singlet lens element in accordance with the present invention.

FIGS. 17A–B are graphs schematically illustrating transverse ray aberration plots at three wavelengths for the achromatic singlet lens element of FIG. 16.

FIGS. 18A–B are graphs schematically illustrating transverse ray aberration plots for a prior art homogeneous lens element having the same shape as the gradient dispersion lens element of FIG. 16.

FIG. 19 is a graph schematically illustrating transverse ray aberration as a function of wavelength for the achromatic singlet lens element of FIG. 16.

DESCRIPTION OF PREFERRED EMBODIMENTS

An axial gradient refractive index n in an element having first and second spherical surfaces arranged on a common optical axis may be defined by an equation $$n = n_{00} + n_{01}z + n_{02}z^2 + n_{03}z^3 + \ldots \quad (2)$$

where z is a distance measured parallel to the optical axis, beginning at the vertex of the first surface, and $n_{01}$, $n_{02}$, $n_{03}$ are respectively linear, quadratic, and cubic coefficients, defining an index profile in a direction parallel to the optical axis.

In the description set forth below, and in the appended claims, the distance z is assumed to be measured in the direction in which light is incident on the lens element when it is oriented for its intended use. Similarly, surfaces of the element are designated first and second surfaces, counted in the direction of incident light.

A curved surface is described as having a positive radius of curvature, or positive curvature, when it appears convex when viewed in the direction of incident light, and negative when it appears concave when viewed in the direction of incident light.

It should be noted that in this convention, a physically bi-convex lens has one positively curved surface and one negatively curved surface.

In general, gradient index lens aberration theory may be expressed by an equation:

$$\sigma = \sum_{i=1}^{n} S_i + \sum_{i=1}^{n} A_i + \sum_{i=1}^{n} G_i + \sum_{i=1}^{n} T_i \quad (3)$$

where $\sigma$ is the total amount of a given aberration present in an optical system. For spherical surfaces, S is the contribution from surface i. In general S is a non-linear function of factors such as the curvature of the surface, refractive indices on either side of the surface, and axial and chief ray intercept coordinates (in an x-y reference plane normal to the optical axis, or z direction). A is the contribution from surface asphericity, if any. In embodiments and examples of the present invention, discussed below, only aspherical surfaces are considered, although the use of spherical surfaces in conjunction with the present invention is certainly not precluded. In spherical surfaces A is assumed to be zero.

G is a surface contribution introduced by the refractive index gradient, and, in general, is a non-linear function of factors such as the gradient index type and profile, and axial and chief ray intercept coordinates. T is the gradient index contribution, and is due to propagation of light through the gradient index medium. It is usually referred to as the transfer term, and is an extremely non-linear function of factors such as the gradient index type and profile, and axial and chief ray intercept coordinates.

Principles of the present invention are explained by first discussing aberration properties of lens elements fabricated from an axial GRIN material having a simple linear profile, i.e., a profile in which the coefficients $n_{02}$ and $n_{03}$ of equation (2) are zero.

Figure 1:
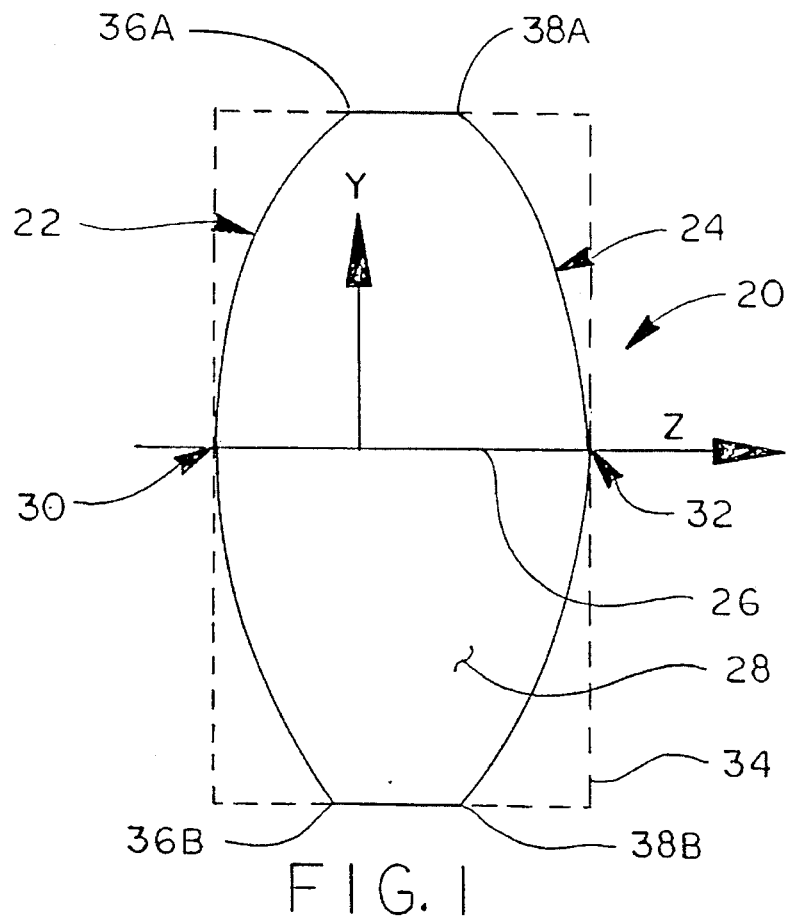
FIG. 1 is an on-axis axial cross section view illustrating a bi-convex lens formed from a linear axial gradient refractive index material.

Turning now to FIG. 1 a biconvex element 20 having first and second surfaces, 22 and 24 respectively, arranged on a common optical axis 26, is illustrated.

Surface 22, according to the above discussed convention, has a positive curvature and surface 24 has a negative curvature. Surfaces 22 and 24 are formed on an optically continuous, graded refractive index material 28 having a linear refractive index gradient. The refractive index profile of material 28 is represented graphically in FIG. 1A. Here, refractive index decreases in the z direction from a maximum value ($n_h$), at point 30 on surface 22, to a minimum value (n1), at a point 32 on surface 24. Phantom line 34 indicates the outline of an original blank or block of material from which element 20 is formed.

Figure 1A:
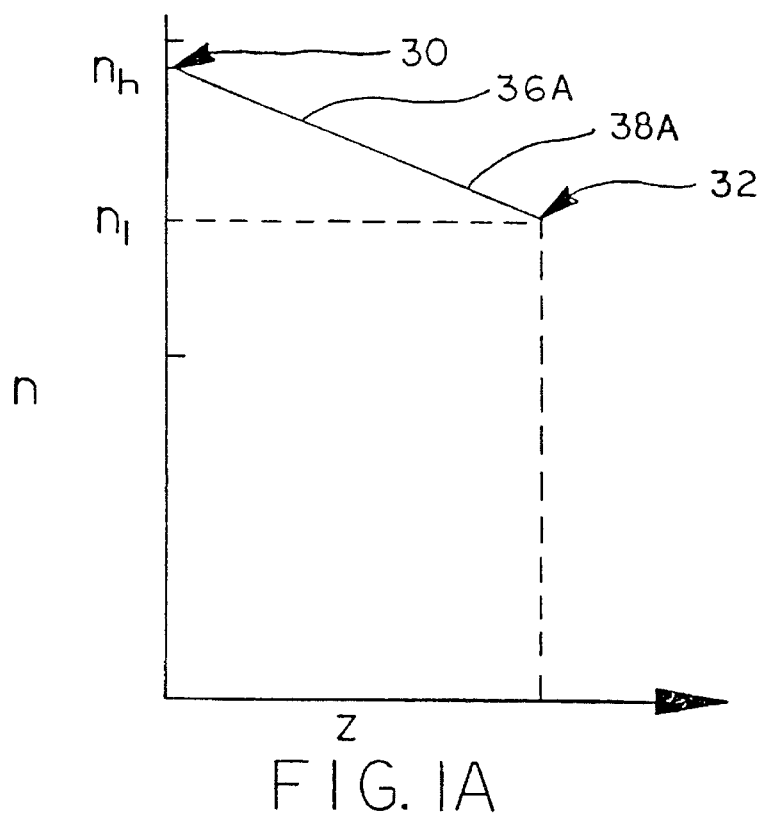
FIG. 1A is a graph schematically illustrating a linear refractive index profile of the lens element of FIG. 1.

Index-change of the refractive index gradient $\Delta n$ is defined by an equation:

$$\Delta n = n_1 - n_h \quad (4)$$

and thus is negative when index decreases in the z direction (parallel to or along optical axis 26), as is the case in FIG. 1A. When index increases in the z direction, $\Delta n$ is positive and is defined by an equation.

$$\Delta n = n_h - n_1 \quad (5)$$

The surface contribution of the refractive index profile (G of equation (3)), is due to the change in refractive index along the surfaces. On surface 22 refractive index decreases along the surface in a direction away from point 30 and has a lowest value at points 36A and 36B. On surface 24, refractive index increases along the surface in a direction away from point 32, and has a highest value at points 38A and 38B. On surface 22, marginal rays are bent less strongly than axial rays. On surface 24, marginal rays are bent more strongly than axial rays. Principal ray positions and directions in lens design are well known to those skilled in the art to which the present invention pertains. Accordingly in FIG. 1, and in other drawings, graphic illustration of principal ray positions has been omitted for clarity.

One common method of examining aberration of lens elements is to compute the aberrations as a function of a dimensionless shape-factor or "bending", X, defined by an equation:

$$X=(R2+R1)/(R2-R1) \quad (6)$$

where R1 is the radius of curvature of the first surface, and R2 is the radius of curvature of the second surface.

When R1 and R2 are negative, X has a value less than −1.0. When R1 is plano (infinite radius of curvature) and R2 is negative, X has a value of −1.0. When R1 is positive, and R2 is negative, but less in absolute value (magnitude) than R1, X has a value of between −1.0 and 0.0. When R1 is positive, and R2 is negative and equal in magnitude to R1, X has a value of 0.0. When R1 is positive, and R2 is negative, but greater in magnitude than R1, X has a value between 0.0 and 1.0. When R1 is positive, and R2 is plano, X has a value of 1.0. When R1 and R2 are both positive, X has a value greater than 1.0.

Figure 2:
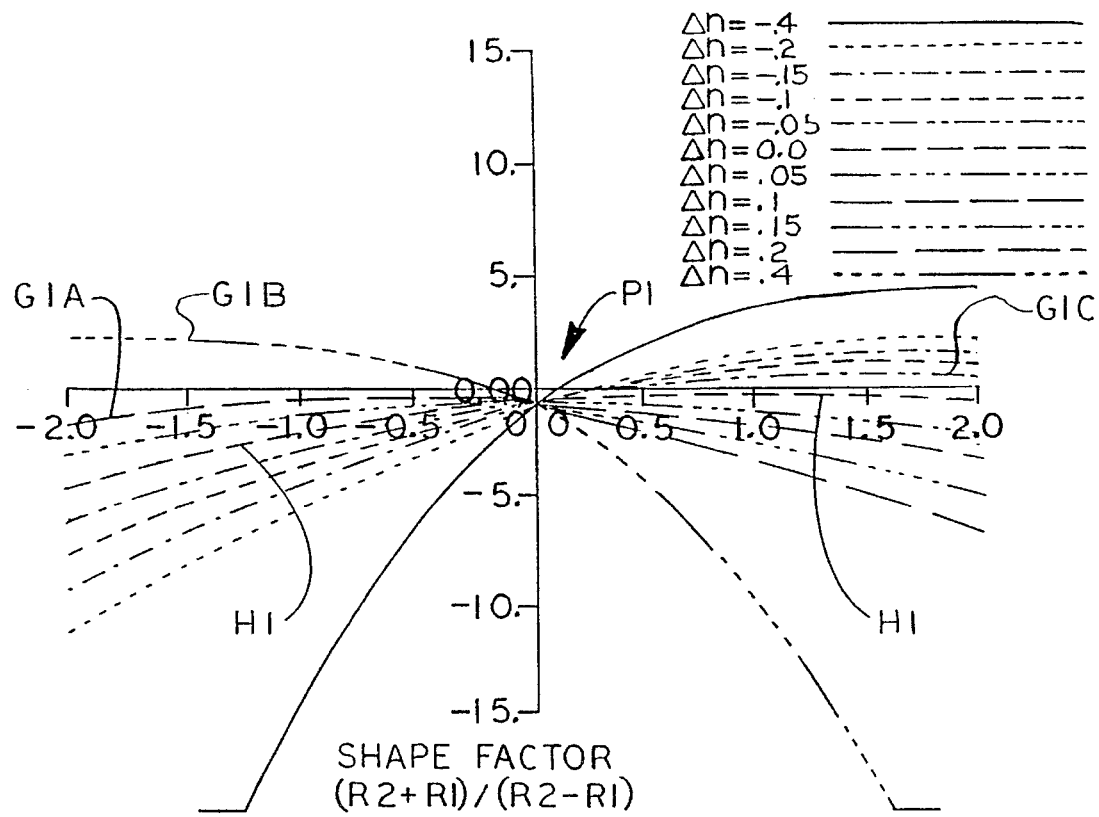
FIG. 2 is a graph schematically illustrating third order spherical aberration for linear axial gradient singlet lens elements as a function of shape-factor and index-change.

In FIG. 2 is shown the computed third order spherical aberration (SA3) versus shape-factor and $\Delta n$ for F/3 singlet lens elements having a thickness of 15.0 millimeters (mm), and a diameter of 80.0 mm. A curve H1, having $\Delta n$=0.0, represents the performance of homogeneous lens elements. For computation purposes, image distance was fixed at 240.0 mm from the second surface. Curves of FIG. 2 represent the performance when RMS spot size for the lens elements is optimized for a point monochromatic light source located at infinity.

Variables in the computation were the values of R1 and R2, and the slope (+ or −) of the index gradient. Constraints were $\Delta n$ and the high extreme index value of an axially graded glass blank from which the lens elements would be made. This was fixed at a value of 1.95. The low index value was dictated by whatever $\Delta n$ was assumed to be.

Continuing now with reference to FIG. 2, curve H1 for a homogeneous lens shows optimum performance at a shape-factor of 1.0. Computations indicate that in order to correct third order spherical aberrations using a linearly graded index, $\Delta n$ must be less than or equal to −0.03 (as indicated approximately by curves G1C) or greater than or equal to 0.25. Provided this condition is satisfied, there is one shape-factor for any given $\Delta n$ which will have zero spherical aberration. In certain cases, as exemplified by curve G1C, there is one value of $\Delta n$ for which a range of values of shape-factor may be substantially corrected, even if aberration at all points in the range is not exactly zero. Generally an element may be defined as substantially corrected when it creates a wavefront distortion of about 0.25 wavelengths or less at a wavelength between about 425 (nanometers) nm and 675 nm for a wavefront traversing the lens.

A prominent feature of the curves of FIG. 2 is the point indicated by arrow P1. This may be referred to as a pivot-point. The existence of such a point may seem, without detailed analysis, to be surprising. It indicates that at shape-factors close to or equal to zero, no amount of axial linear gradient is effective in correcting third order spherical aberration.

In an axial gradient index lens element, third order spherical aberration contribution of the inhomogeneous surfaces $G_{1S}$ may be approximated by an equation:

$$G_{1S}=-2(\emptyset/d)^2 n_{01} y_1^4 X \quad (7)$$

wherein $\emptyset$ is the power of element $n_{01}$ linear coefficient of the index slope as defined in equation (2) and $y_1$ is the height of the edge of the lens aperture above the optical axis (the radius of the lens element), and d is given by an equation:

$$d=2(n_o-1)+\Delta n(1-X) \quad (8)$$

where $n_o$ is the base refractive index at the first vertex of the element (see FIGS. 3 and 4) and $\Delta n$ and X are as defined above.

Equation (7) indicates that the mechanism which creates the pivot-point is an effective cancellation of spherical aberration produced by the first surface of an element, by spherical aberration produced by the second surface of that element.

The discovery of the pivot-point provides useful insight into designing an optical system incorporating one or more elements having a linear axial refractive index gradient. It also points the way to designing gradient index materials, having an index profile other than linear, from which elements having certain unique and desirable properties may be fabricated. This will be discussed in detail below.

Continuing now with a discussion of the curves of FIG. 2, on the one hand, the pivot-point P1 indicates that in order to maximize the effect of a linear gradient in a system design, elements having a shape-factor close to zero should be avoided. Elements having a shape-factor less than −1.0 and greater than 1.0 will make most effective use of a linear gradient.

On the other hand, however, there may be situations in which it is desirable to incorporate a gradient index lens with a shape-factor selected to provide a lens element in which spherical aberration is invariant with index-change. Such a situation may be presented, for example, when trying to incorporate a gradient index element in an existing design with a minimum of redesign, or when trying to balance aberrations other than spherical (by means of a gradient index), without disturbing spherical aberration. It is clear that an element specifically configured to have a pivot-point i.e. to have a selected aberration invariant with refractive index homogeneity, can be an important building block in optical system and lens design.

Consideration of equation (7) indicates that one means of avoiding creation of a pivot-point at shape-factors at or close to zero, may be to provide a gradient index slope at the first surface of an element which is significantly different from the slope at the second surface of that element.

In one embodiment of the present invention, this is accomplished by providing an axial gradient index material in which refractive index varies axially in accordance with a predetermined non-linear function of distance measured in the direction of the optical axis. Providing a non-linear gradient allows index gradient slope, as well as the actual index value, to vary axially. A non-linear function may be selected such that gradient slope at the first surface of a lens element will be greater than gradient slope at the second surface, or vice versa. This is effective, to some degree, in reducing the above-discussed canceling effect of first and second surfaces. Preferred index gradient functions are quadratic and cubic functions, i.e., functions in which coefficients $n_{02}$ and $n_{03}$ of equation (2) have a finite value.

In computing performance of lenses using quadratic and cubic gradient index profiles, optimization was conducted for RMS spot size as a discussed above for linear refractive index profiles. However, certain constraints were placed on the form a particular profile could take. These are illustrated graphically in FIGS. 3 and 4. A brief explanation of the graphical presentation is set forth below.

For shape-factors requiring a negative value of $\Delta n$ (see FIG. 3), index gradient slope of profile QC3 was lowest at the first surface of the element and highest at the second surface of the element. For shape-factors requiring a positive value of $\Delta n$ (see FIG. 4), index gradient slope of profile QC4 was lowest at the first surface of the element, and highest at the second surface of the element. A gradient index profile could not have an inflection point between the maximum and minimum values of refractive index. Additionally, all points on the profile were required to have a higher value than points on a linear profile (L3 of FIG. 3 and L4 of FIG. 4) joining the maximum and minimum values of refractive index $n_h$ and $n_1$, except, of course, at the actual maximum and minimum values. Optimization provides coefficients $n_{01}$, and $n_{02}$ for quadratic function and $n_{01}$, $n_{02}$ and $n_{03}$ for cubic functions.

Figure 3:
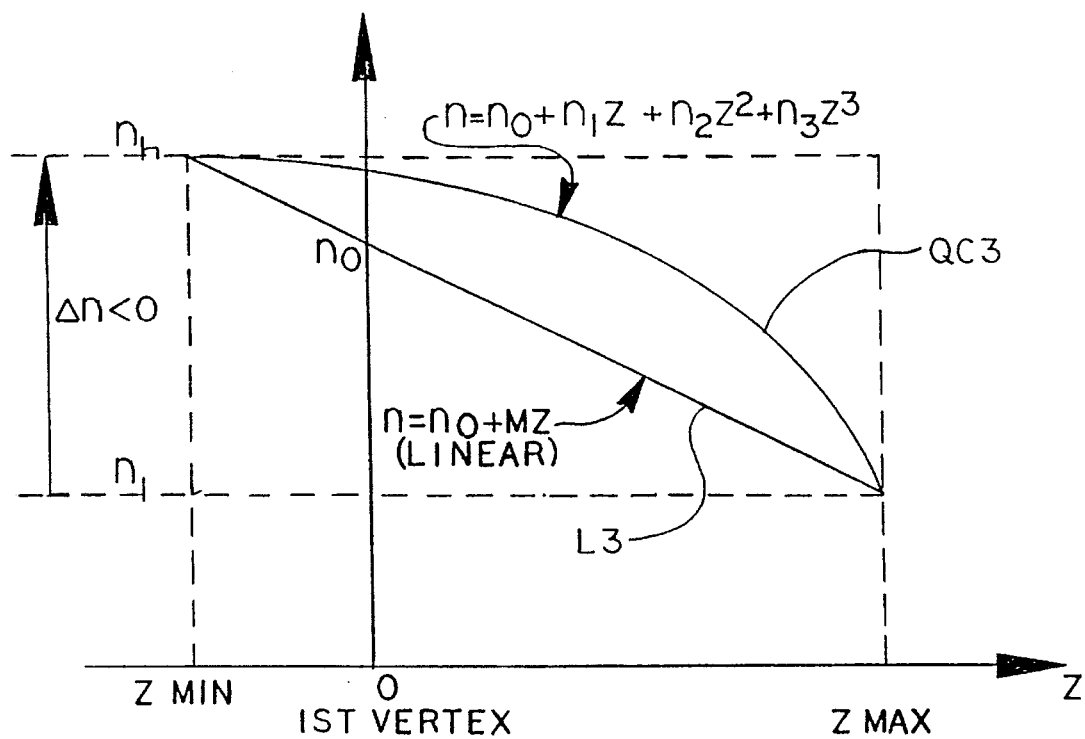
FIG. 3 is a graph schematically illustrating one range of allowed cubic and quadratic gradient index profiles for singlet lens elements in accordance with the present invention.
Figure 4:
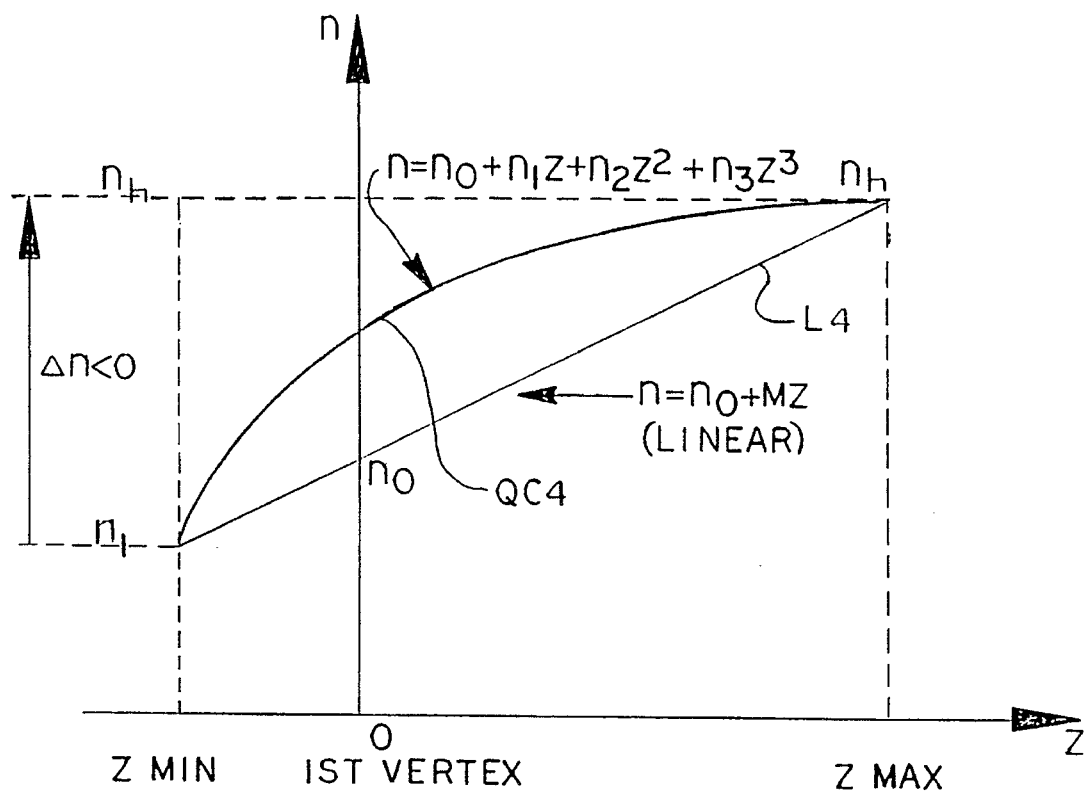
FIG. 4 is a graph schematically illustrating another range of allowed cubic and quadratic gradient index profiles for singlet lens elements in accordance with the present invention.

It is pointed out that profiles described in FIGS. 3 and 4 illustrate cases in which the first surface of an element is concave. In such cases the vertex of the surface has a greater has a lower or higher refractive index than the edge, depending on whether $\Delta n$ is respectively negative (see FIG. 3) or positive (see FIG. 4).

The above discussed profile constraints should not be construed as limiting. Profiles in accordance with the constraints are simply easier to realize in a practical GRIN material. Further, avoiding an inflection point in a profile simplifies the optimization of the profile. It will be evident to those skilled in the art to which the present invention pertains, that other non-linear profiles may be used with greater or lesser effect.

Figure 5:
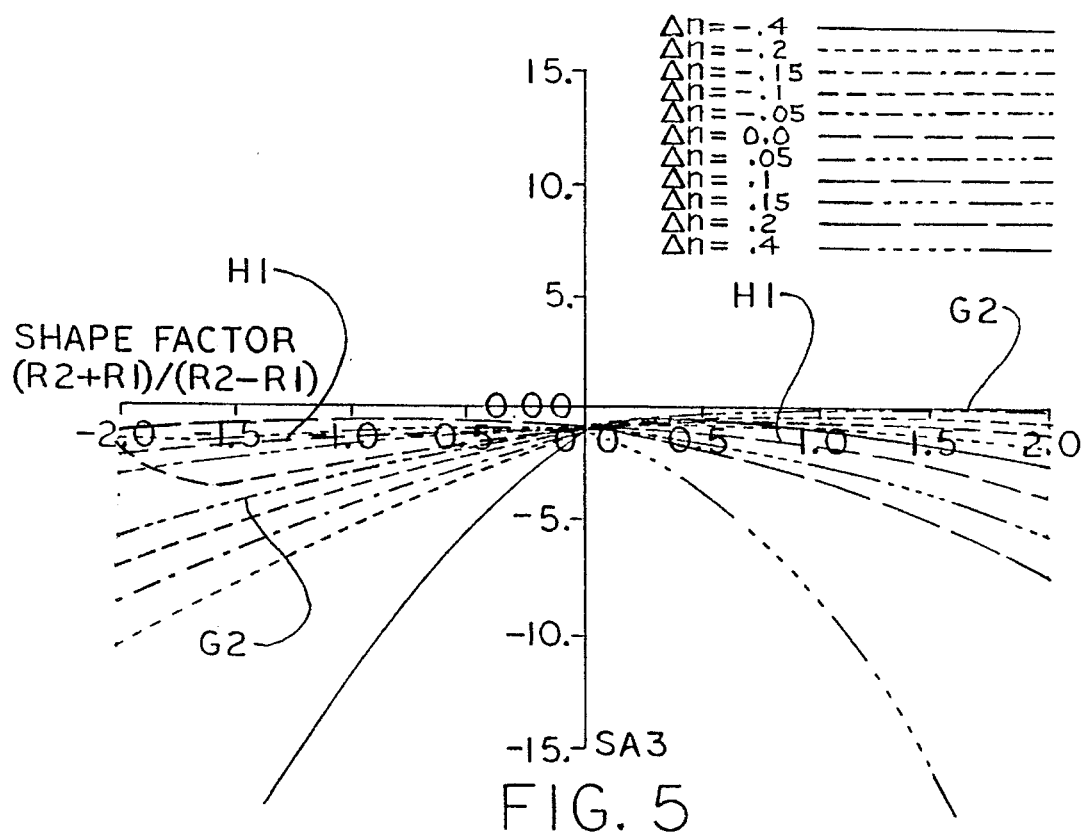
FIG. 5 is a graph schematically illustrating third order spherical aberration as a function of shape-factor and index-change for quadratic axial gradient, singlet lens elements in accordance with the present invention.
Figure 6:
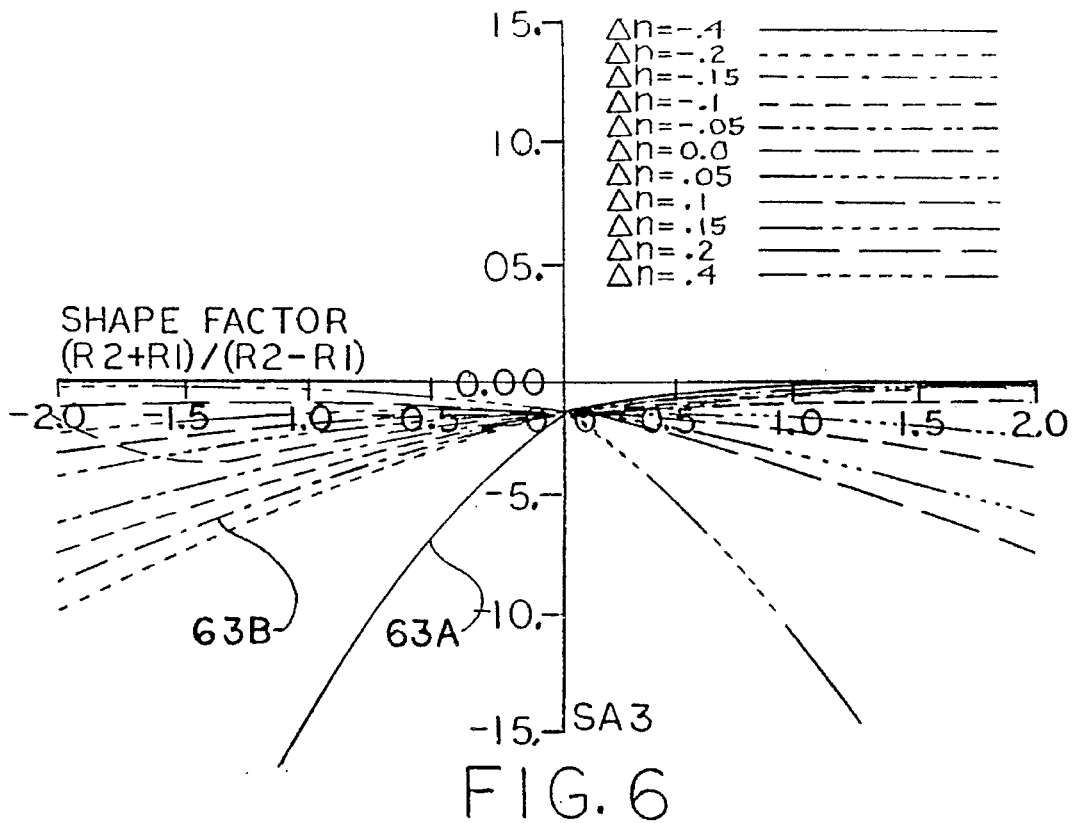
FIG. 6 is a graph schematically illustrating third order spherical aberration as a function of shape-factor and index-change for cubic axial gradient, singlet lens elements in accordance with the present invention.

Continuing now with a discussion of the effect of quadratic profiles, FIGS. 5 and 6 graphically illustrate computed third order spherical aberration versus shape-factor and $\Delta n$ for F/3 singlet lens elements having a thickness of 15.0 millimeters (mm), and a diameter of 80.0 mm. A curve HI having $\Delta n=0.0$ represents the performance of homogeneous lens elements. Image distance was fixed at 240.0 mm from the second surface. Curves represent the performance when RMS spot size for the lens is optimized for a point monochromatic light source located at infinity.

It is evident from FIGS. 5 and 6, that providing a quadratic or a cubic profile is not as effective as might be expected in eliminating the pivot-point at shape-factors close to 0.0. Further, it can be seen that a quadratic profile does not provide a curve which changes the sign of the third order spherical aberration at any $\Delta n$ between −0.4 and 0.4. Significant, however, is that a quadratic profile having a $\Delta n$ value of about −0.05 (FIG. 5, curve G2) provides substantially corrected elements at all shape-factors between about −0.05 and −2.0. A cubic profile having a $\Delta n$ value of about −0.20 will provide precise correction (about zero spherical aberration) for elements having any shape-factor between about 0.05 and 2.0. Any value of $\Delta n$ between about −0.40 and −0.15 (FIG. 6, curves G3A and G3B) will provide at least substantial correction in this range.

In effect, use of a quadratic or a cubic index profile having a $\Delta n$ value with a predetermined range makes possible production of a range of "iso-aberrant" lens elements, having shape-factors between about 0.5 and 2.0, which have substantially zero third order aberration. The effectiveness of this a design tool compared with simple linear gradients will be appreciated from consideration of the following simple example.

Suppose that in the design of an optical system it is determined that an gradient index element must have $\Delta n=-0.2$ and have zero third order spherical aberration. It can be seen from FIG. 2 than an element having a linear axial gradient provides zero third order aberration at a shape-factor of about 0.4.

Now suppose, for example, that to correct coma the shape-factor of the element is desired to be 1.5. Changing the shape-factor of a linear gradient element to this value would cause a substantial and undesirable increase in third order spherical aberration. The same shape change in an element having a quadratic gradient, however, would produce a negligible change in third order spherical aberration.

The above discussion has been directed primarily to consideration of axial gradient profile effects on third order spherical aberration. Similar effects are observed for other third order aberrations, for example, coma and astigmatism. These are illustrated in FIGS. 7A–C, which graphically depict third order tangential coma (TCO3), as a function of shape-factor and $\Delta n$, for linear gradient F/3 singlet lens elements having a thickness of 15.0 millimeters (mm), a diameter of 80.0 mm, and a stop positioned at 0.0±30.0 mm from the element.

Figure 7A:
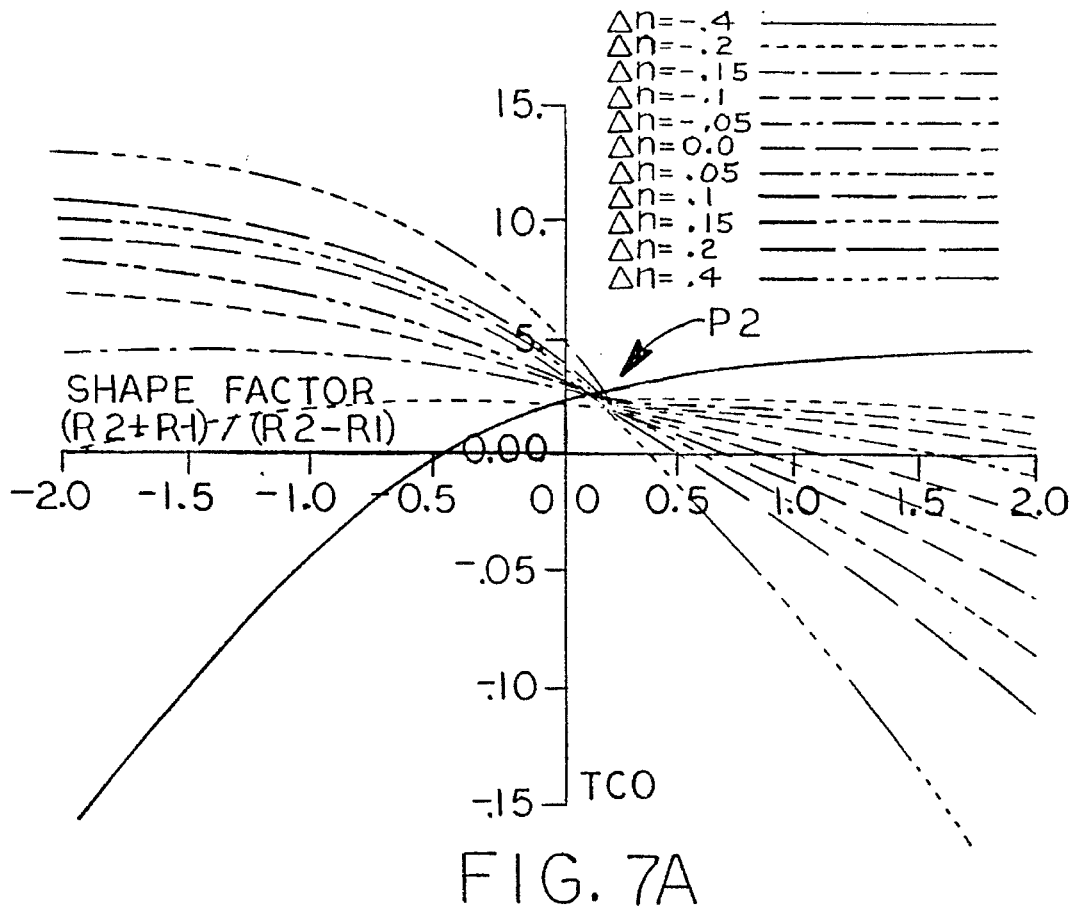
FIGS. 7A–C are graphs schematically illustrating third order coma as a function of stop position, shape-factor, and index-change for linear axial gradient, singlet lens elements.
Figure 7B:
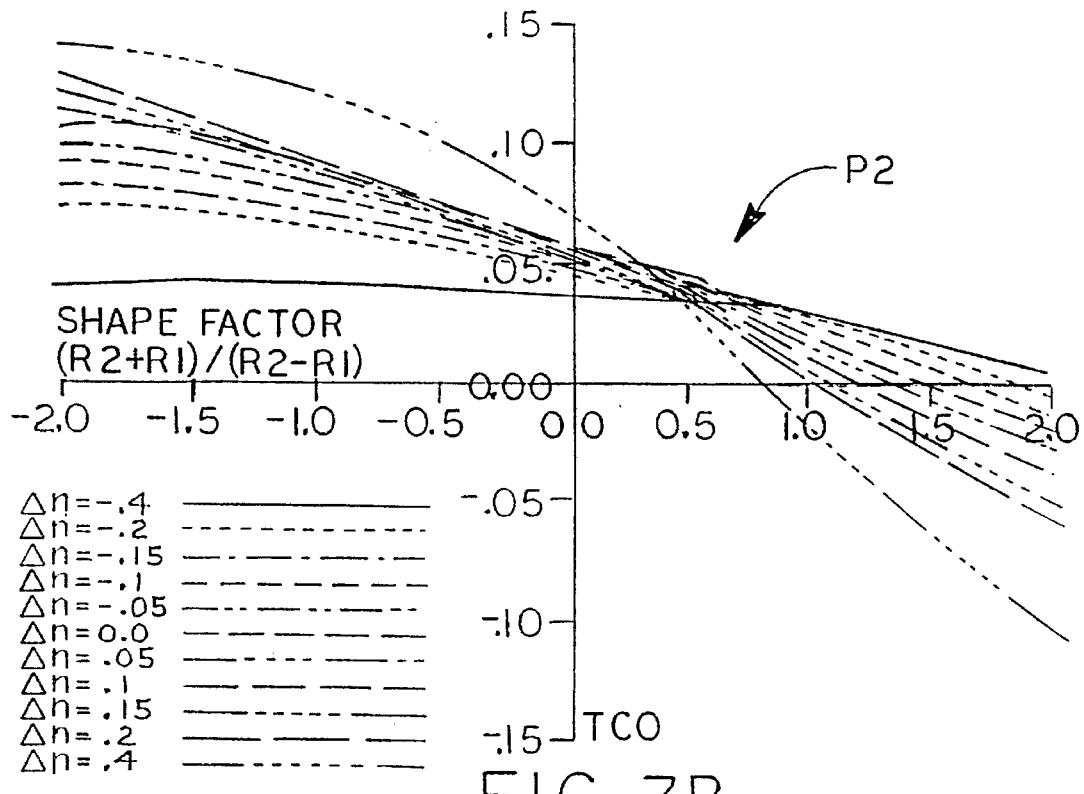
Figure 7C:
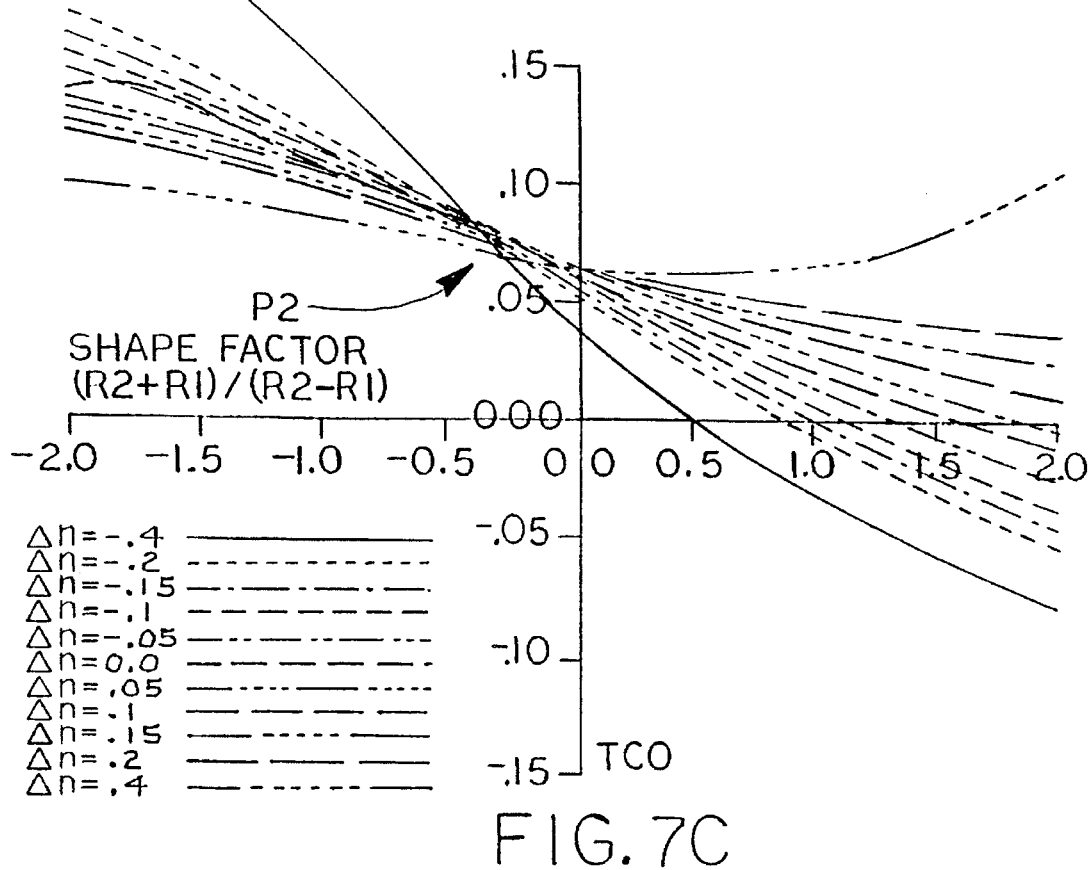
Figure 8A:
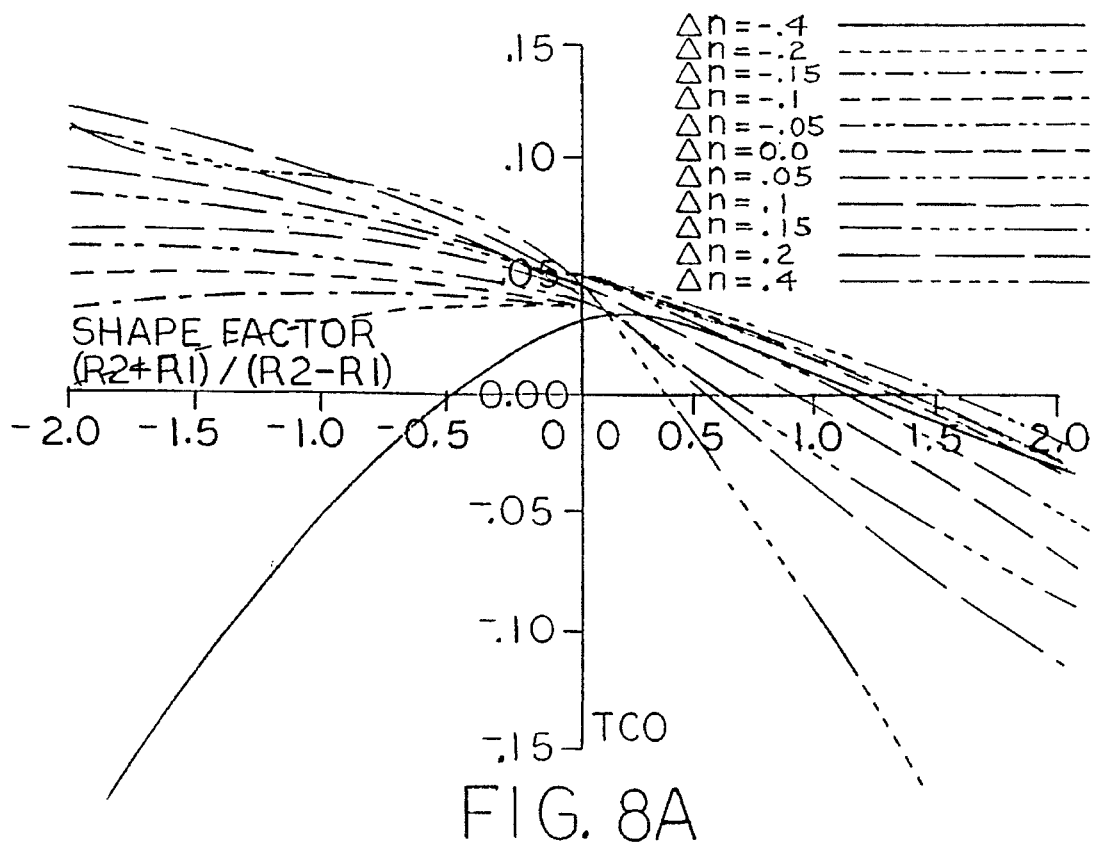
FIGS. 8A–C are graphs schematically illustrating third order coma as a function of stop position, shape-factor, and index-change for quadratic axial gradient, singlet lens elements in accordance with the present invention.
Figure 8B:
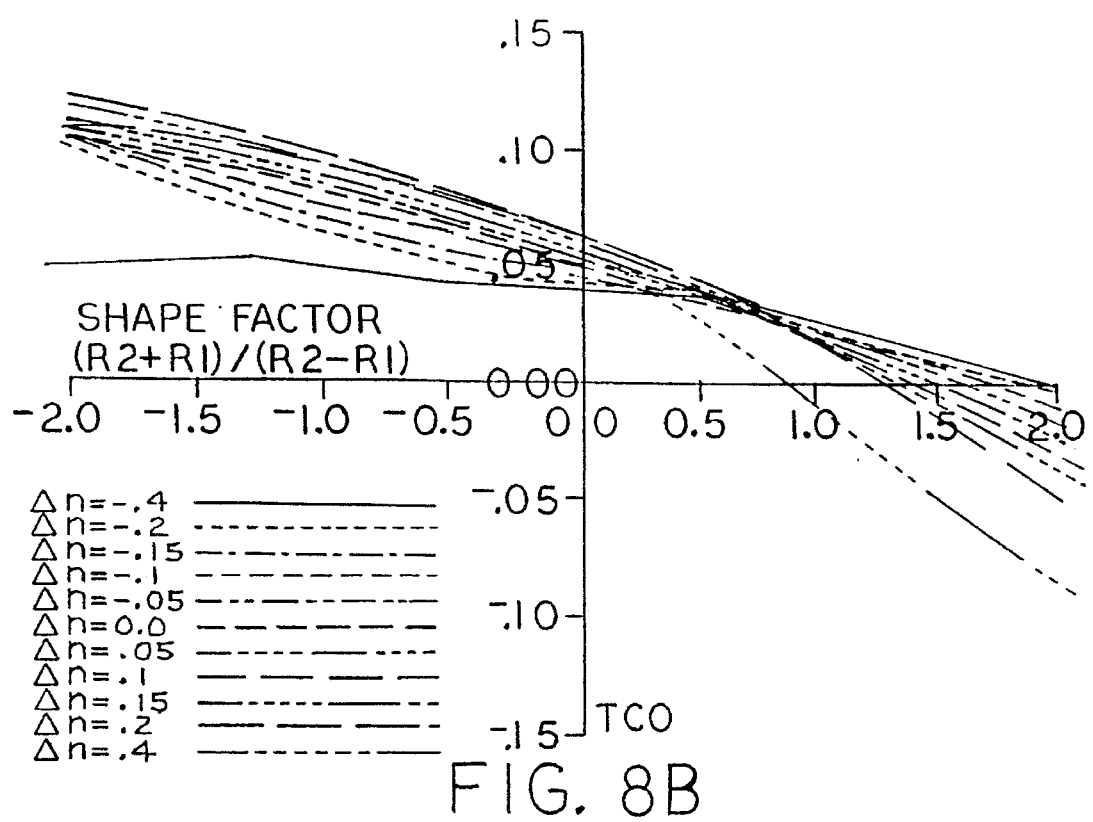
Figure 8C:
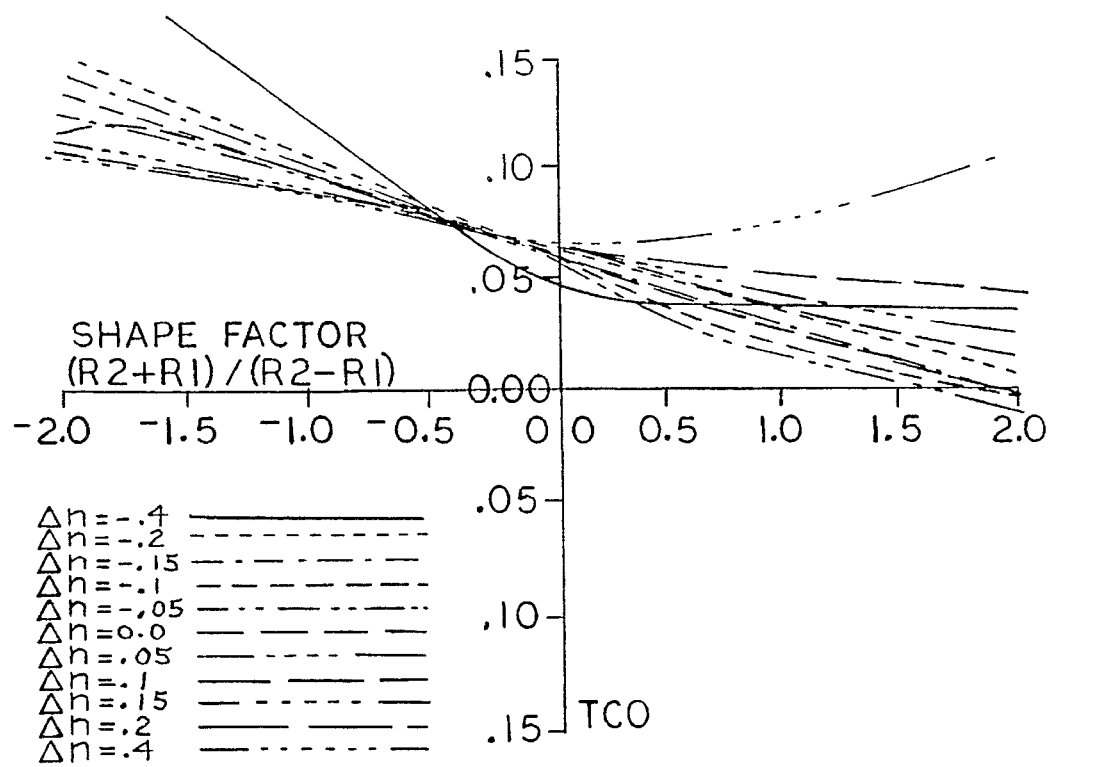

FIGS. 8A–C illustrate the TCO3 performance of elements having the same dimensional specification as the lens of FIGS. 7A–C, but having a quadratic axial gradient.

Figure 9A:
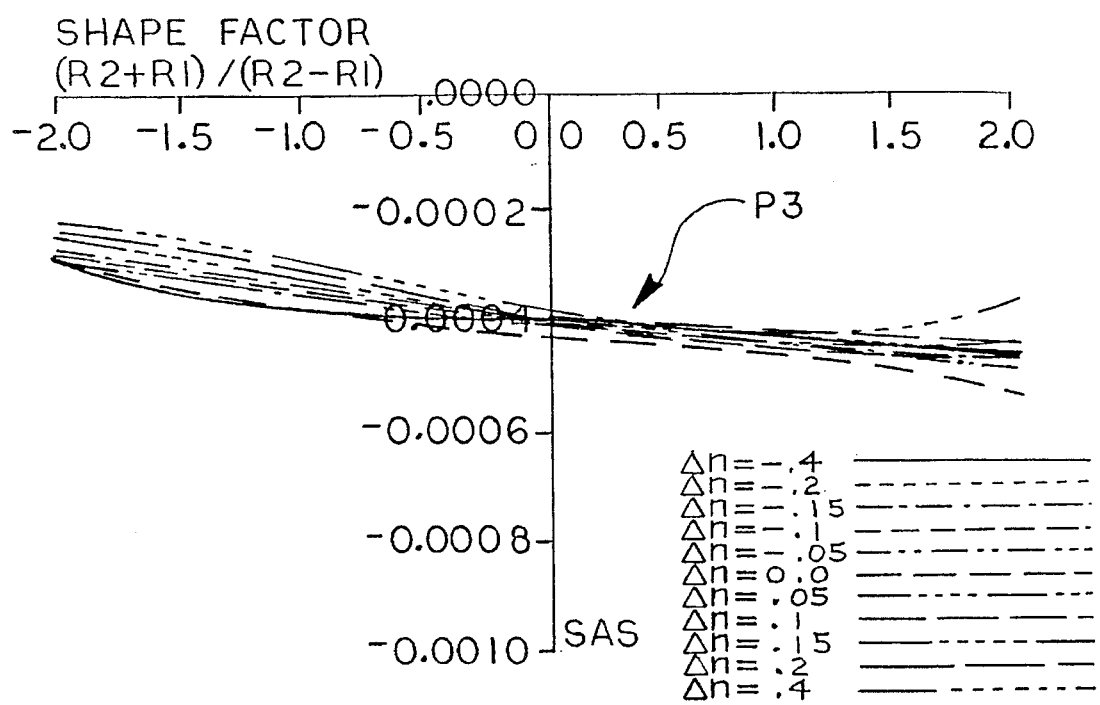
FIGS. 9A–C are graphs schematically illustrating third order astigmatism as a function of stop position, shape-factor, and index-change for linear axial gradient, singlet lens elements in accordance with the present invention.
Figure 9B:
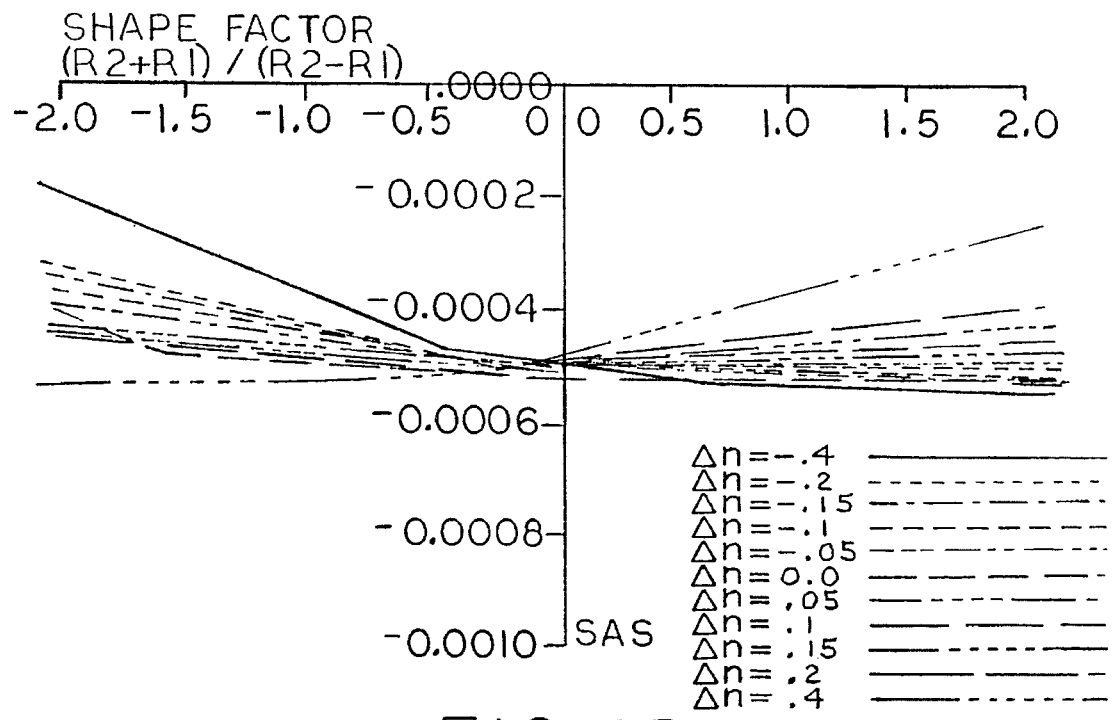
Figure 9C:
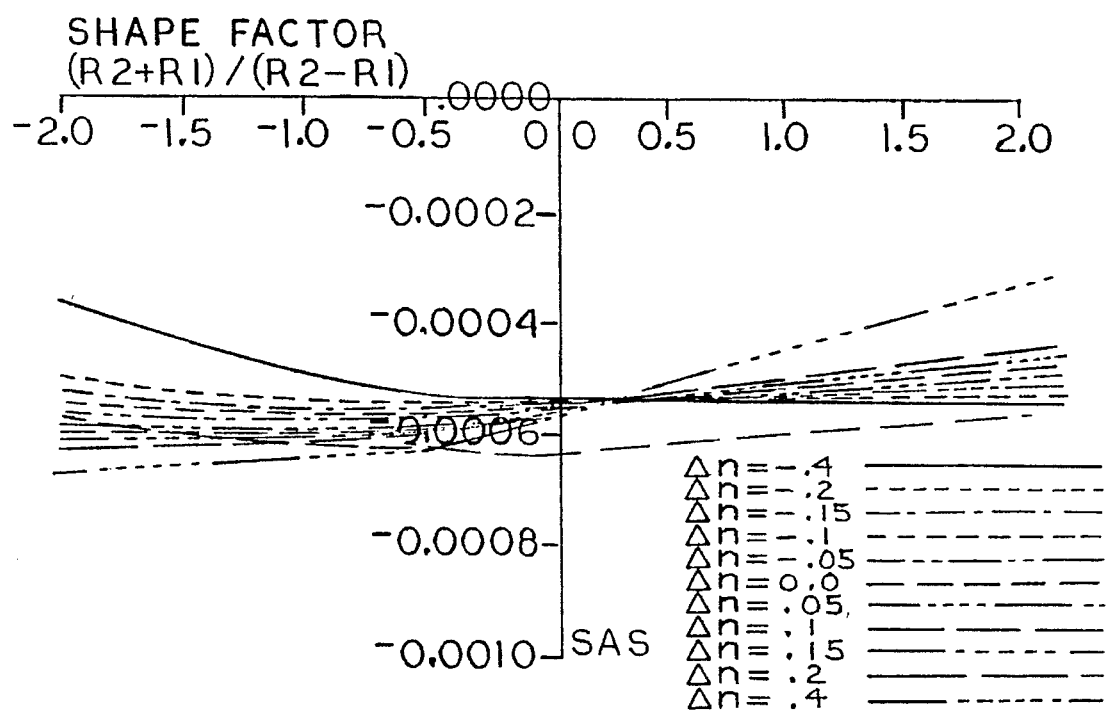
Figure 10A:
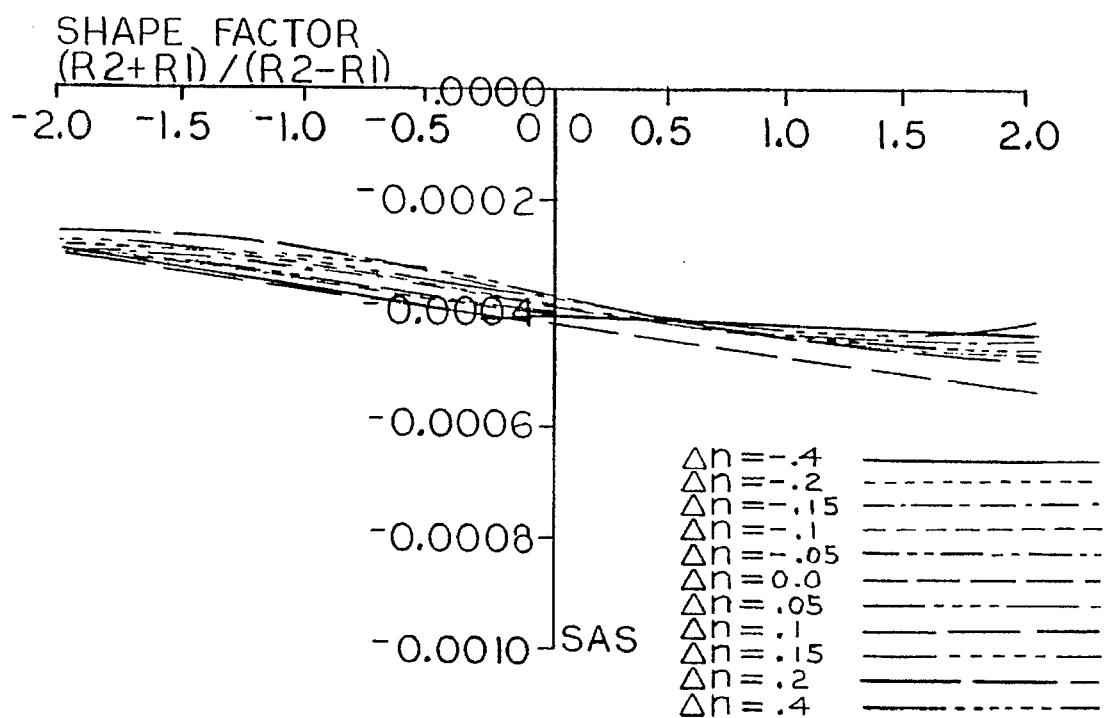
FIGS. 10A–C are graphs schematically illustrating third order astigmatism as a function of stop position, shape-factor, and index-change for quadratic axial gradient, singlet lens elements in accordance with the present invention.
Figure 10B:
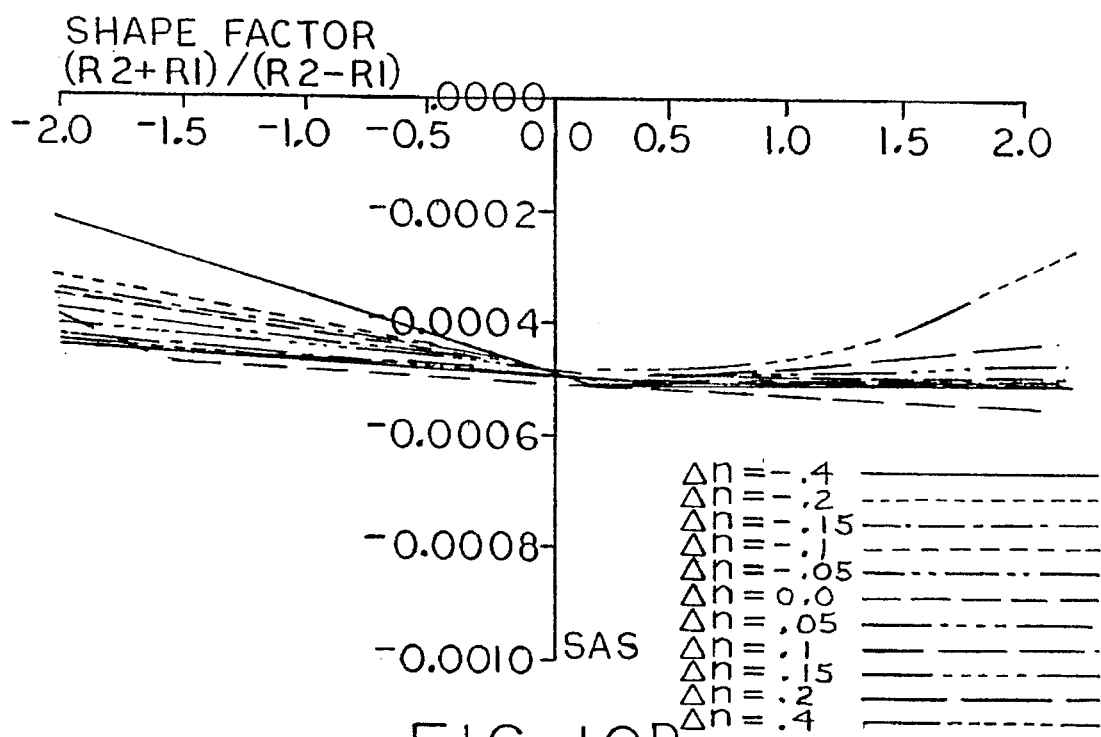
Figure 10C:
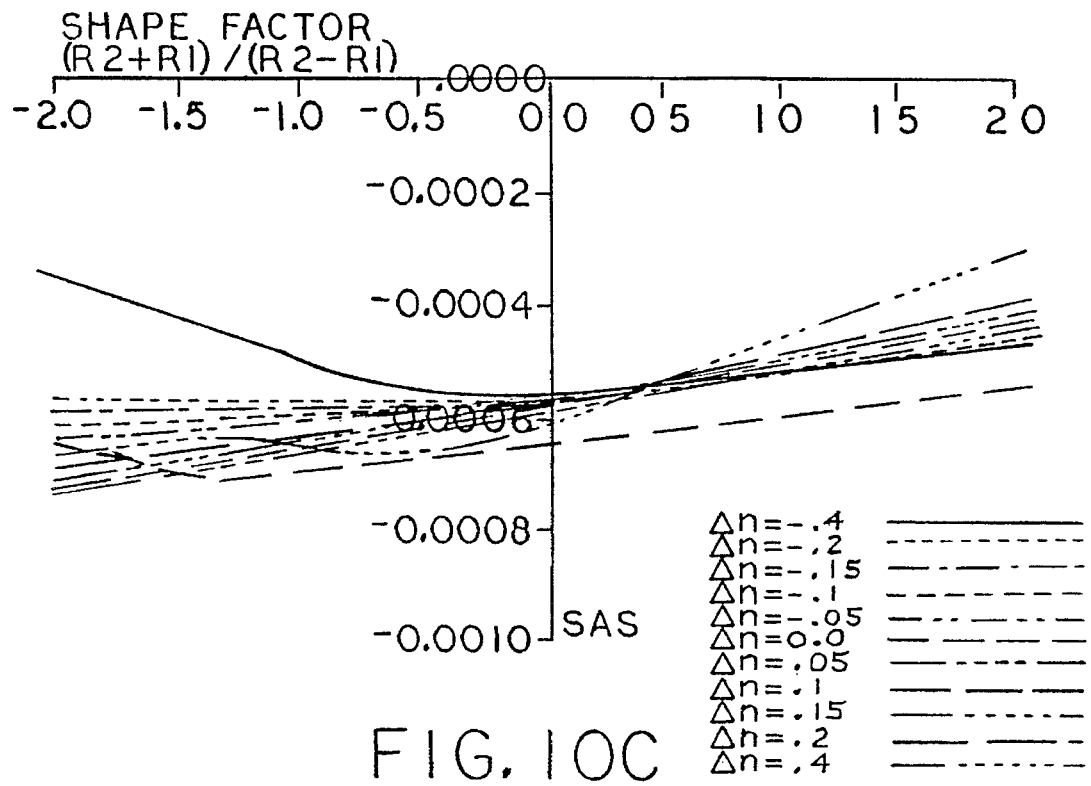

FIGS. 9A–C illustrate the third order sagittal astigmatism (SAS) performance of elements having the same dimensional specification as the lens of FIGS. 7A–C and having a linear axial gradient. FIGS. 10A–C illustrate the third order sagittal astigmatism performance of elements having the same dimensional specification as the lens of FIGS. 7A–C, and having a quadratic axial gradient.

It should be noted that TCO and SAS performance for cubic gradient profiles was determined to be very similar to the results for quadratic gradient index profiles. Accordingly, graphic illustration of results for cubic profiles has been omitted to avoid repetition.

The relevance of the data presented in FIGS. 7A–C, 8A–C, 9A–C, and 10A–C will be evident to those skilled in the art to which the present invention pertains. Accordingly, a detailed explanation is not presented here. However, a brief description of certain important features of the data is set forth below.

A pivot-point, or at least a narrow pivot region, exists for third order coma aberration curves. Further, the coma pivot-point may exist at positive and negative shape-factors between about −0.5 and 0.5, depending on placement of the stop. This is indicated, for example, by arrow P2 in FIGS. 7A–C. Comparing FIGS. 7A–C and FIGS. 8A–C, it can be seen that coma curves for a range of value of $\Delta n$ are more tightly grouped for quadratic than for linear index profiles.

A pivot-point exists for astigmatism, although it is less distinct than for coma. This is indicated, for example, by arrow P3 of FIG. 9A. It should also be noted (see FIG. 10B) that astigmatism is substantially invariant for $\Delta n$ values between about −0.2 and 0.4 over a range of shape-factors between about −2.0 and 2. This is an example of an iso-aberrant lens in which the aberration is not zero or substantially corrected, but has a substantially constant, non-zero value.

Referring now to FIGS. 11, and 11A–C, another method of providing an iso-aberrant range of lens elements using a graded index material is illustrated. Here, a biconvex element 40 (see FIG. 11) having first and second surfaces, 42 and 44 respectively, arranged on common optical axis 26, is illustrated.

Surfaces 42 and 44 are formed on a transparent monolithic unit 46. Unit 46 comprises sections 46A and 46B, which are aligned in the direction of optical axis 26. Section 46A has an axially graded refractive index, and section 46B has an essentially homogeneous refractive index. Surface 42 is formed on section 46A and surface 44 is formed on section 46B. Section 46A may be described as forming a gradient refractive index cap for element 40. Accordingly, in the following description, monolithic elements of the type exemplified by element 40 are referred to as "GRIN-cap" elements.

Figure 11:
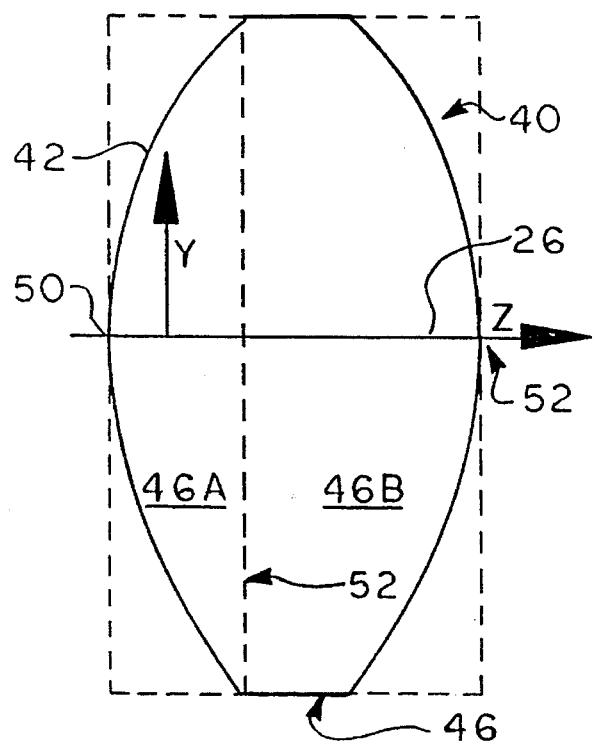
FIG. 11 is an on-axis axial cross-section view illustrating a bi-convex lens formed from a monolithic unit including a graded refractive index material and an optically homogenous material in accordance with the present invention.
Figure 11A:
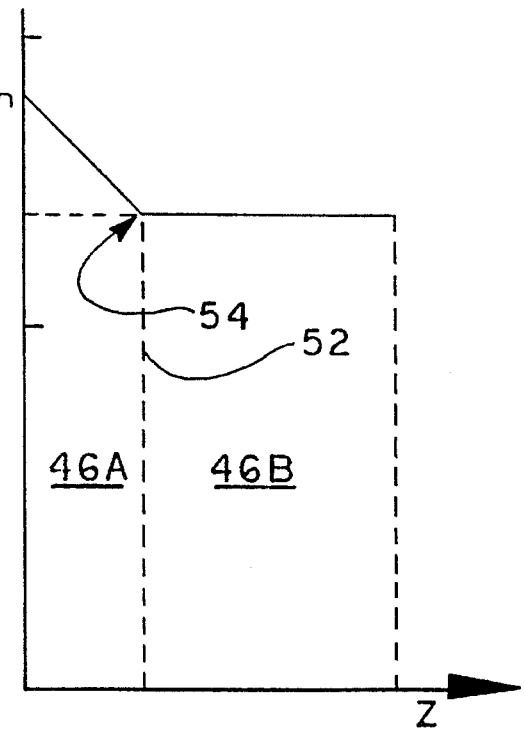
FIG. 11A is a graph schematically illustrating a refractive index profile of the lens element of FIG. 11.
Figure 11B:
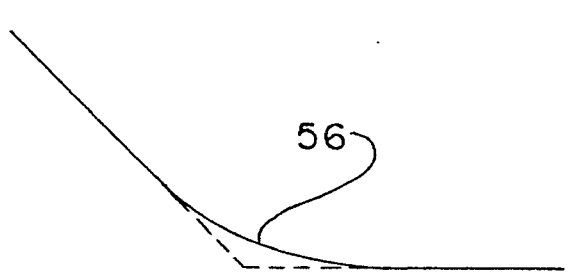
FIG. 11B is an enlarged portion of the refractive index profile of FIG. 11A schematically illustrating refractive index continuity at a junction between the graded index and homogeneous materials of FIG. 11.
Figure 11C:
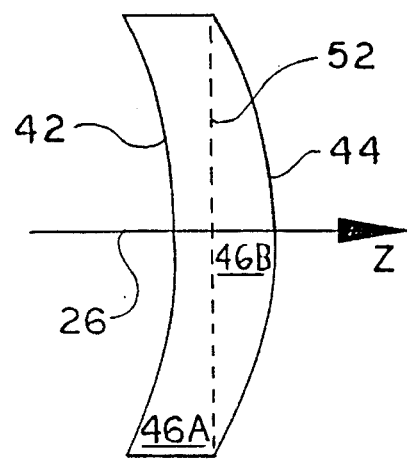
FIG. 11C is an on-axis axial cross-section view illustrating a positive meniscus lens element formed from a monolithic unit including a graded refractive index material and an optically homogenous material in accordance with the present invention.

One example of a refractive index profile of element 40 is represented graphically in FIG. 11A. Here, section 46A has a linear refractive index profile, wherein refractive index decreases in the z direction (negative $\Delta n$) from a maximum value ($n_h$), at point 50 on surface 42, to a minimum value ($n_1$), at a junction between sections 46A and 46B indicated by broken line 52. Preferably, the gradient refractive index of section 46A and the homogeneous refractive index of section 46B have substantially the same value at any location on junction 52.

Preferably, unit 46 is fabricated as a single optically continuous block of material, for example, according to the above-referenced fusion technique of Hagerty et al.. In a material fabricated in this way, junction 52 would not be sharp and singular, as depicted at point 54 of FIG. 11A, but would be diffuse. It would thus provide a graded, optically continuous refractive index transition, as indicated by line 56 of FIG. 11B. This would effectively eliminate any possibility of a reflective interface occurring at junction 52. A reflective interface would need to be taken into account in optical design calculations, and, further, may adversely effect properties of element 40.

It should be noted that forming element 40 by bonding together separately-fabricated graded and homogeneous sections is not precluded. In order for element 50 to function as a single element, however, index difference between the sections, or any intervening adhesive material, should not exceed 0.1.

It should also be noted, that while section 46 is illustrated in FIG. 11 as comprising only that portion of element on which surface 42 is formed, this should not be construed as a limitation in GRIN-cap elements. Rather, formation of a GRIN-cap element requires only that one surface be formed entirely on a graded refractive index material and the other surface be formed entirely on a material having an essentially homogeneous refractive index. This effectively eliminates the surface effect canceling phenomenon of lenses formed entirely from GRIN material. Axial apportionment of amounts of GRIN and homogeneous materials, i.e, location of junction 52, may be used by a designer as a variable, for example, to take advantage of transfer contribution of the GRIN material. Clearly, however using only sufficient GRIN material to form a surface is particularly desirable as the cost of GRIN material, while not prohibitive for many applications, is, presently, greater than many common optical glasses.

Figure 12:
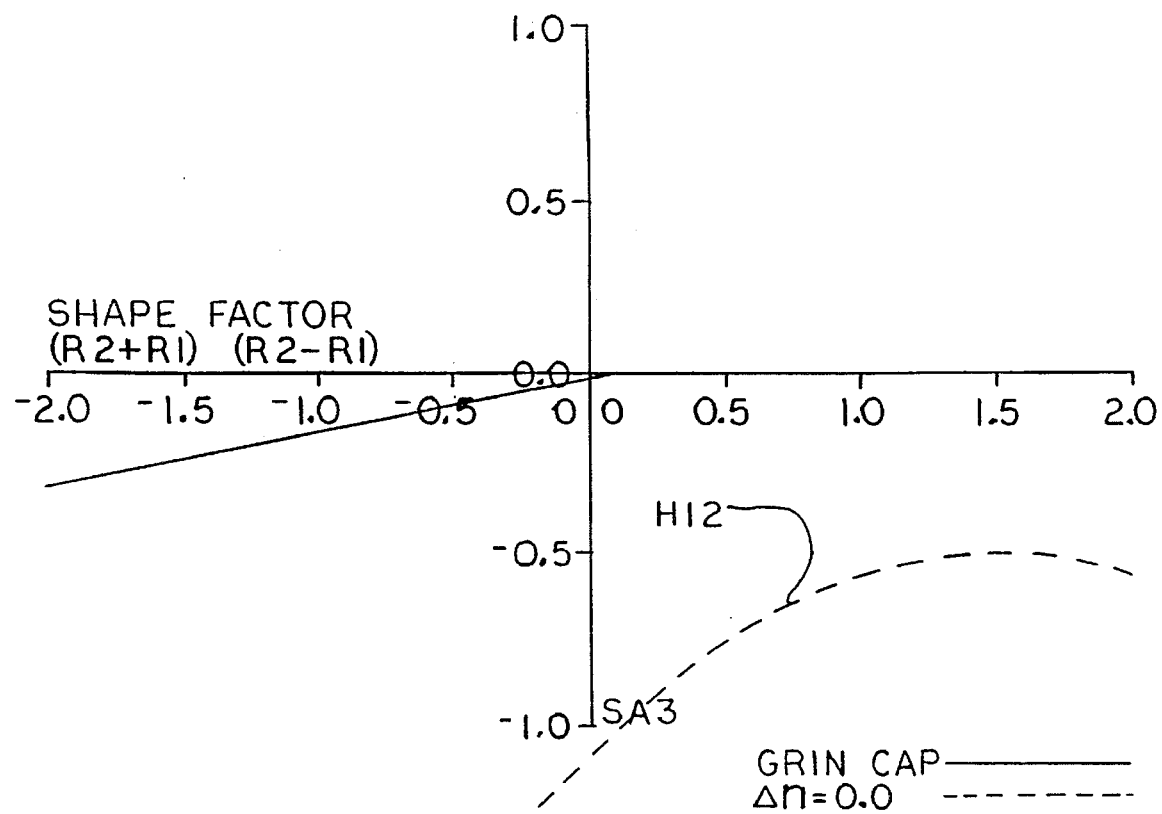
FIG. 12 is a graph schematically illustrating third order spherical aberration as a function of shape-factor for GRIN cap elements in accordance with the present invention.

Continuing now with a discussion of optical properties of GRIN-cap elements, FIG. 12 illustrates computed third order spherical aberration as function of shape-factor for a range of such elements having shape-factors between about $-2.0$ and $2.0$. The curve H12 for a homogeneous lens is shown for comparison. Optimization for each element was carried out in accordance with above-discussed criteria. For elements having shape-factors of 0.0 or greater, it was assumed that first surface 42 was generated on axially graded refractive index material having negative index-change ($-\Delta n$), and second surface 44 was generated on essentially homogeneous material. For elements having shape-factors less than 0.0, (see FIG. 11C) it was assumed that second surface 44 was generated on axially graded refractive index material having positive index-change ($+\Delta n$), and first surface 42 was generated on an essentially homogeneous material. Gradient refractive index material was assumed to be linear gradient material in each case. Table 1 shows $\Delta n$ and m for specific values of X. The value m is the index slope of the axially graded material and is equivalent to $n_{01}$ of equation 2 in the absence of any other than first order terms.

TABLE 1

| x | $\Delta n$ | m |
|---|---|---|
| −2.0 | 0.0852 | 0.01218 |
| −1.5 | 0.0931 | 0.01330 |
| −1.0 | 0.0975 | 0.01515 |
| −0.5 | 0.1043 | 0.01877 |
| 0.0 | 0.2248 | 0.02262 |
| 0.5 | 0.0805 | −0.00730 |
| 1.0 | 0.0477 | −0.00318 |
| 1.5 | 0.0194 | −0.00158 |
| 2.0 | 0.0242 | −0.00186 |

FIG. 12 illustrates that, by using an linear axially graded material having a value of $\Delta n$ between about $-0.25$ and $-0.02$, a GRIN-cap element having any shape-factor between about 0.0 and 2.0 can be designed to have zero third order spherical aberration.

It is pointed out that although third order spherical aberration is not zero for negative shape-factors, even the worst case example (at X=−2.0), in theory at least represents a RMS theoretical wave-front distortion of about 0.18 wavelengths. This indicates that higher order aberrations are being controlled by the element.

It is estimated that practical GRIN-cap elements requiring gradient index-change values having a magnitude less than 0.25 are capable of providing wavefront distortion less than 0.25 wavelengths of light having a wavelength between about 425 nanometers (nm) and 675 nm at any shape-factor between about −2.0 and 2.0.

Returning now to a discussion of axial GRIN elements, it has been shown such elements may be shaped to form a pivot-point at which a particular aberration is essentially constant for a wide range of both positive and negative $\Delta n$ values. The value of such a pivot-point element, together with a limitation presented by having such a pivot-point close to zero shape-factor, is discussed above. As described above however, for spherical aberration, even non-linear axial GRIN elements appear to provide only limited ability for selection of pivot-point position. For coma and astigmatism, freedom for pivot-point selection may achieved by appropriate selection of a stop position. Further, computed results indicate that such elements are more effective in correcting spherical aberration in elements having positive values of shape-factor than negative values of shape.

Figure 13:
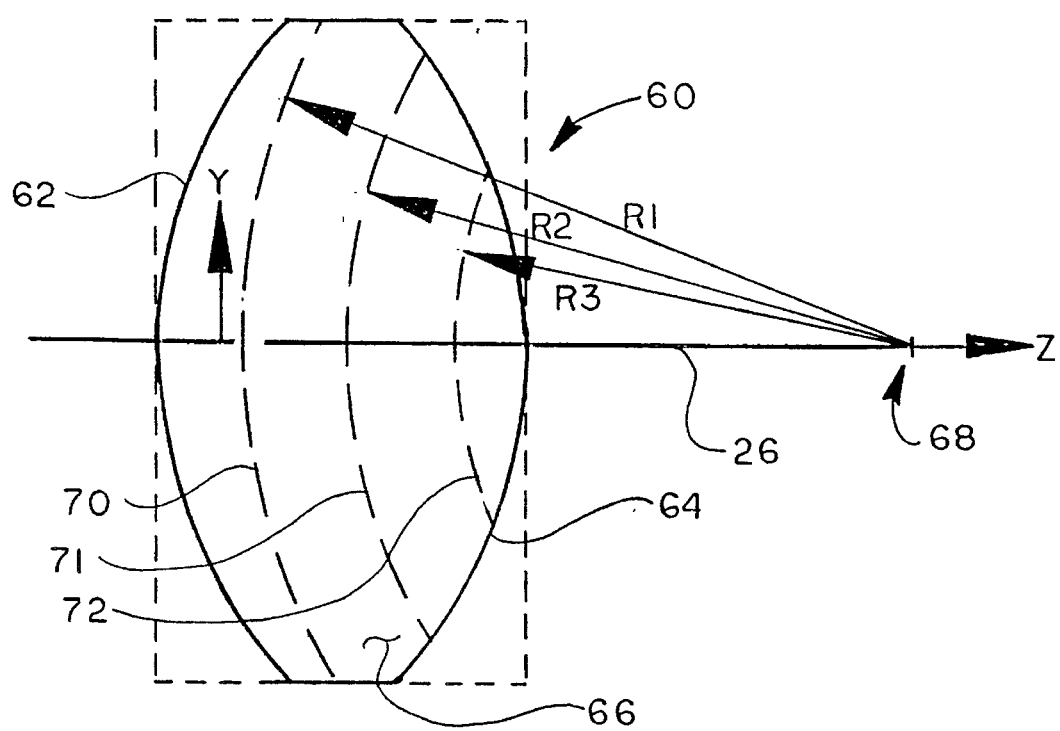
FIG. 13 is an on-axis axial cross-section view illustrating a bi-convex lens formed from a spherical gradient refractive index material in accordance with the present invention.
Figure 14:
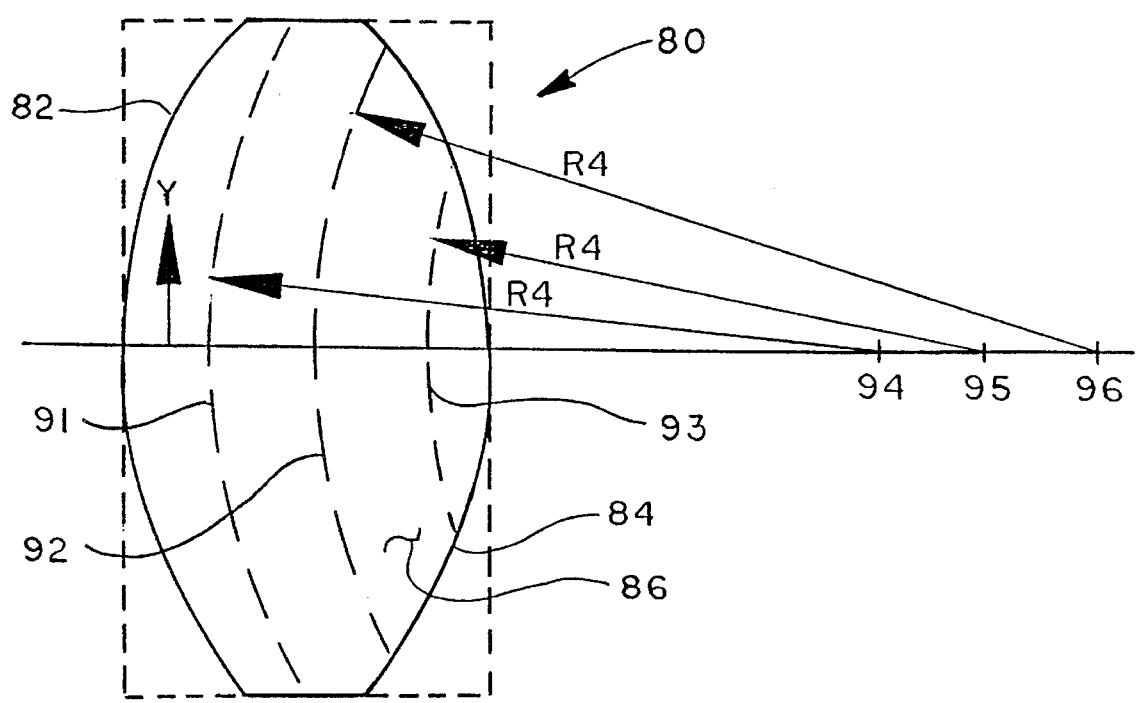
FIG. 14 is an on-axis axial cross-section view illustrating a bi-convex lens formed from a plano gradient refractive index material in accordance with the present invention.

It has been determined that considerable freedom for selecting a pivot-point position, together with a significant improvement in ability to correct elements having near zero and negative shape-factors, is afforded by providing an axial gradient index material, wherein the refractive index also has a radial component. FIGS. 13 and 14 illustrate two methods of providing such a radial component.

In FIG. 13 is shown what may be termed a "spherical gradient" material. Here, a lens element 60 has first and second surfaces 62 and 64 respectively arranged on a common optical axis 26. Element 60 is formed from a spherical gradient refractive index material 66. Refractive index at any point within element 60 is a predetermined function of distance from a point 68 on optical axis 26. Refractive index is thus constant at any point on an imaginary spherical plane having a center of curvature at point 28. Such a plane may be conveniently described as an "iso-index" plane. The effect of such a spherical gradient is to create a material which not only has a refractive index that is actually graded, but also varies in a direction perpendicular to the axis, for example in direction y. As such, the refractive index has both axial and radial gradient components. Three imaginary planes 71, 72, and 73 having decreasing radii of curvature, R1, R2 and R3 respectively, are illustrated.

It can be seen that one effect of the spherical refractive index gradient is to reduce index variations over first surface 62, while increasing index variations over surface 64. If point 68 were coincident with the center of curvature of surface 62, index variations on that surface would be essentially eliminated.

It will be evident to those familiar with the art to which the present invention pertains that a true spherical refractive index gradient material would be difficult and costly to produce, even on a relatively small scale. Further, lens elements formed from such a material are difficult to analyze, as a function defining the above discussed radial component of refractive index is different at any axial position.

In FIG. 14 is illustrated a method by which benefits of a spherical gradient may be realized without significant difficulties in manufacture or analysis. Here, a lens element 80, having first and second surfaces 82 and 84 respectively, is formed from a gradient refractive index material 86.

Material 86 is formed such that refractive index varies according to a predetermined function along optical axis 26, and is constant, at any point within the element, on an imaginary spherical plane having a fixed predetermined radius of curvature, and having a center of curvature on optical axis 26. As depicted in FIG. 14, imaginary planes 91, 92, and 93 all have a fixed radius of curvature R4, and have centers of curvature 94, 95 and 96 respectively extending along optical axis 26. Such a material may be termed a plano gradient material, or a shell gradient material A material such as material 86 may be readily fabricated by a variation of the method of Hagerty. By way of example, an extended blank of an axial gradient material may be formed from flat parallel plates, and then slumped over a spherical mandrel having the desired radius of curvature. Further, the constant radius of curvature of the iso-index planes makes lenses formed from a plano gradient material easier to analyze than a spherical gradient material.

Figure 15A:
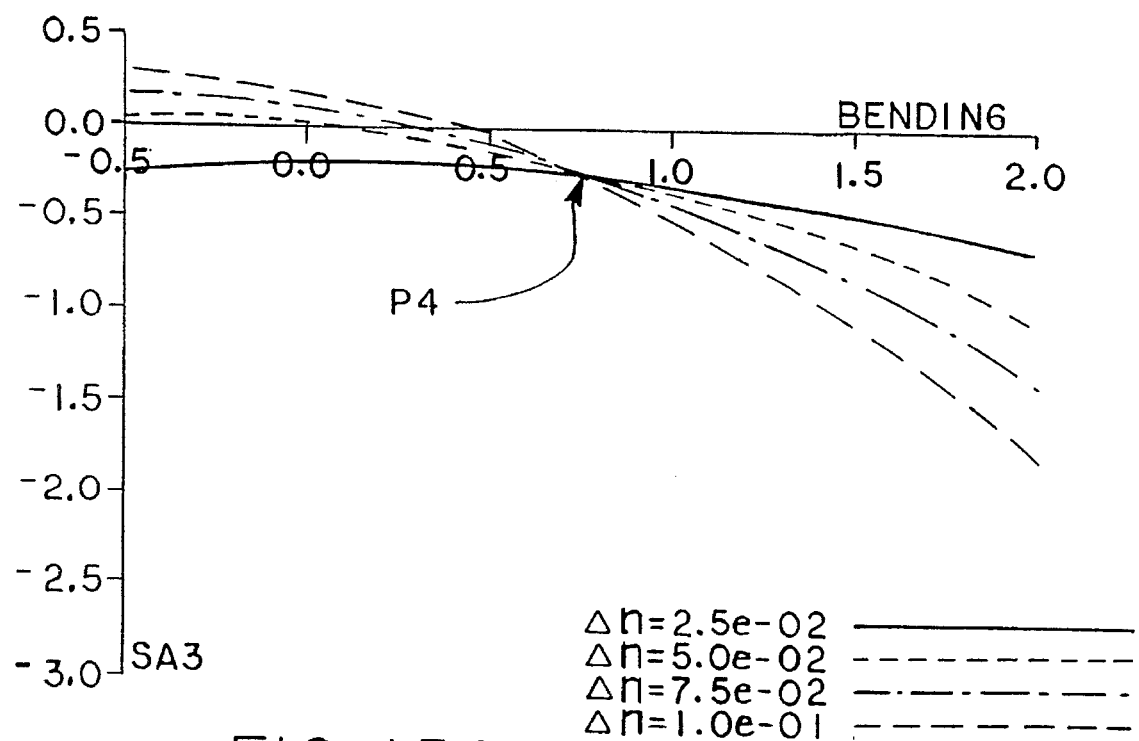
FIGS. 15A–B are graphs schematically illustrating third order spherical aberration as a function of shape-factor, index-change and iso-index plane curvature for plano gradient, singlet lens elements in accordance with the present invention.
Figure 15B:
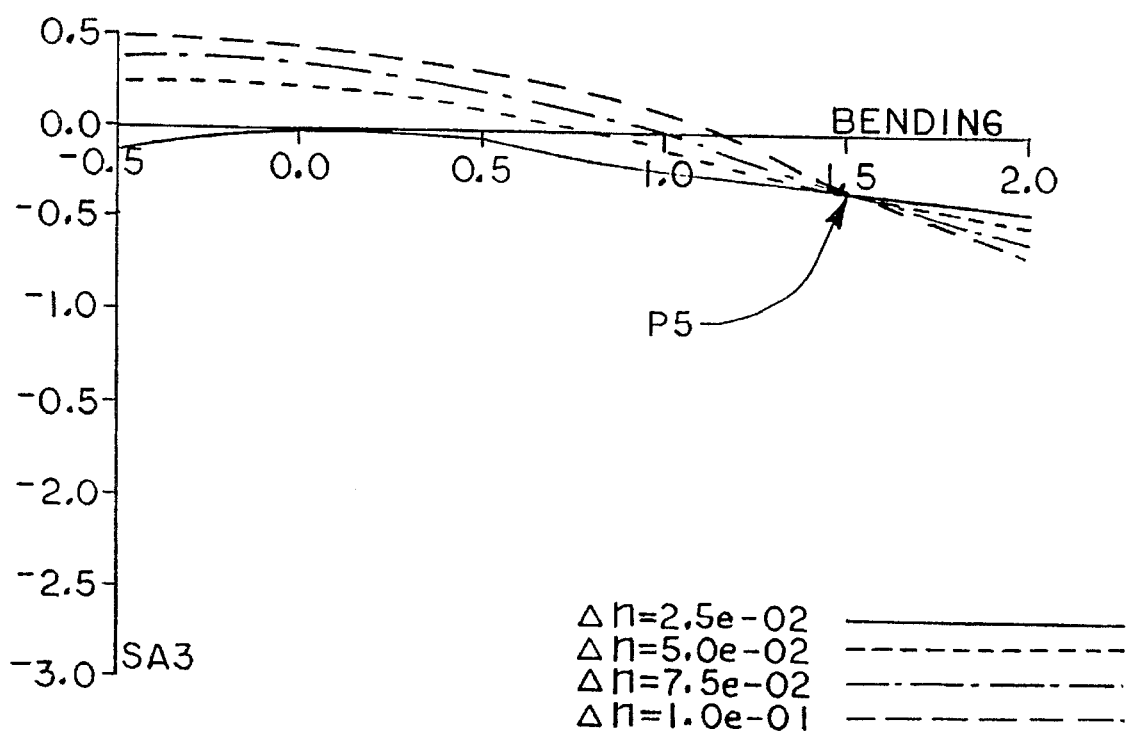

FIGS. 15A–B show computed third order spherical aberration as a function of shape-factor and index-change $\Delta n$ for 80 mm diameter F/3 lens elements having a thickness of about 15 mm. Optimization was conducted as described above for other examples of GRIN lens elements. In each case, the lens element was assumed to be formed from a plano gradient refractive index material having a refractive index increasing linearly along the optical axis.

In FIG. 15A, iso-index planes (e.g. 91–93 of FIG. 14) were assumed to have a radius of curvature of 50 mm. It can be seen that the plano gradient element may be corrected at shape-factors between about –0.5 and 0.5, which is not the case for elements having only an axially graded refractive index. The corrections can be effected by selecting an appropriate value of $\Delta n$ between about 0.05 and 0.1. This correction is possible, at least in part, because the pivot-point P4 occurs at a shape-factor of about 0.75. This correction process appears to favor elements having negative values of shape-factor.

In FIG. 15B, iso-index planes were assumed to have radius of curvature of 25 mm. Here, correction for shape-factors between –0.5 and 0.5 is possible when $\Delta n$ has a value of about 0.025. This is realized, at least in part, by a displacement of the pivot-point P5 to a shape-factor of about 1.6.

Elements including a plano gradient material are described above in terms of material having a positive curvature of iso-index planes, positive values of $\Delta n$, and a linear refractive index profile on axis. This, however, should not be construed as restrictive. Clearly, a plano gradient lens element may have many useful combinations of positive or negative curvature of iso index planes, positive or negative values of $\Delta n$, and linear or non-linear variation of refractive index along the optical axis. In particular, such combinations provide a means by which a GRIN lens element may be selected to have a pivot-point at any shape-factor between about –2.0 and 2.0.

All elements discussed have useful performance features. These features depend on selection of one or more of a particular refractive index gradient, a gradient index profile, and a $\Delta n$ value. Set forth below is a discussion of a unique and useful achromatic singlet lens element which is formed from a material having gradient dispersion of refractive index.

Dispersion is a property of all optical glasses. It is the variation of refractive index with wavelength (color) of light. Usually, dispersion of an optical material is specified by a dimensionless number known as the Abbe number. The Abbe number or "V" number is inversely proportional to difference in refractive index of a material at the "F" and "C" emission lines of hydrogen. The F and C lines have wavelengths of 486.13 nm and 656.27 nm respectively.

Although, in recent years, special glasses having low dispersion have been developed, there has yet to be developed a material for which dispersion is zero.

Axial primary chromatic aberration of a lens is defined to be the difference in transverse ray height for marginal rays traced at the "F" and "C" wavelengths. When this difference is zero, or negligible, the lens is said to be achromatic.

For a thick lens element of a given focal length, and composed of homogeneous glass, axial chromatic aberration is the sum of first and second surface contributions to the chromatic aberration. Each surface contribution depends, in turn, on factors including the dispersion of the homogeneous glass, the refractive index change across the surface, and the angle of incidence of a marginal ray going from the axial object point to the edge of the lens element aperture.

It is not possible to correct primary axial chromatic aberration in a single lens element which is formed entirely from homogeneous optic material. Only a combination of two elements, for example, one having large positive power and low dispersion, and the other having smaller negative power and high dispersion, may be used to correct chromatic aberration.

It is pointed out above that for monochromatic aberrations, such as spherical, coma, and astigmatism, a lens formed from a gradient refractive index material includes both surface contributions and a transfer contribution to the aberration. Such is also the case for chromatic aberration. It is generally believed, however, that such a transfer contribution is negligible in an axial gradient material, as an axial gradient material does not provide any refractive power.

What appears to have been overlooked, however, is that refractive power is not a prerequisite for providing chromatic aberration. Indeed, the achromatic singlet lens in accordance with the present invention depends on a significant contribution of the gradient index transfer contribution to chromatic aberration.

Throughout this discussion, GRIN materials have been described as having a smoothly varying index or being optically continuous. Axial gradient GRIN materials of the type discussed above, however, may be considered, for some computation purposes, as a stack of infinitesimally thin plates, each sequentially higher or lower in refractive index (or dispersion) than the other. Plane parallel plates in a converging beam of light will indeed cause chromatic aberration, and, further, in a sense opposite that aberration caused by surfaces converging the beam. Increasing or decreasing dispersion of the plates through the stack increases the aberration effect of the plates.

It has been determined that for a large starting angle of the marginal ray in the GRIN material, and for a large change in dispersion between first and second surfaces of the lens, the transfer contribution to chromatic aberration of the axial GRIN material is of a magnitude comparable to the surface contributions, but opposite in sign. Because of this, it may be used to provide an achromatic singlet lens element. Conditions for providing correction of chromatic aberration may be described empirically as follows.

If dispersion at the first surface of the element is low (such that the contribution of that surface to chromatic aberration is low); if the power of the first surface is large (such that initial marginal ray angle is large); if the change in dispersion is large; and if the marginal ray angle at the second surface is small (to reduce the second surface contribution to chromatic aberration), then the transfer contribution may be used to balance the sum of the surface contributions.

Conditions for providing achromaticity in a singlet element having a linear dispersion gradient may be approximated mathematically by an equation $$\delta(X-1)=2v_{01} \quad (9)$$

where $v_{01}$ is the initial dispersion, on axis, of the gradient dispersion material, $\delta$ is the axial change in dispersion, and x is the lens element shape-factor as defined above. It should be noted that $v_{01}$ is a measure of the dispersion of the GRIN material which is computed from the difference in refractive index of the material at the hydrogen F and C lines and the refractive index at the helium "d" line (587.6 nm). A model for computing $v_{01}$ for a gradient dispersion material formulated from lead glasses is set forth below.

A starting base index is defined as n00 measured at the "d" line.

Coefficients a, b, c, d, and e are defined having values −0.0064881, 0.004469861, 0.7259083, −0.0005255596, and −0.2740918 respectively.

An initial Abbe number $V_i$ is computed from the equation:

$$V_i=(1/a+bn_{00})^{0.5} \quad (10)$$

Initial F and C line indices are then computed by equations:

$$n_{Fi}=n_{00}+(n_{00}-1)(c/V_i+d) \quad (11)$$

$$n_{Ci}=n_{00}+(n_{00}-1)(e/V_i+d) \quad (12)$$

Initial dispersion $v_{01}$ is then given by the equation:

$$v_{01}=((n_{Fi}-n_{00})^2-(n_{Ci}-n_{00})\omega_F^2)/(\omega_F\omega_C^2-\omega_C\omega_F^2) \quad (13)$$

where $\omega$ is the Buchdahl wavelength factor and is given by the equation:

$$\omega=(\omega_\lambda-\omega_0)/(1+2.5(\omega_\lambda-\omega_0)) \quad (14)$$

where $\omega_\lambda$ is the wavelength of the line of interest in micrometers (μm) and $\omega_0$ is the base wavelength (here the "d" line 0.5876 μm). This yields values for $\omega_C$ and $\omega_F$ of 0.0586375 and −0.1358877 respectively.

A final value of refractive index is calculated from equation (2) above wherein coefficients $n_{02}$, $n_{03}$, and higher, are zero, and z is the thickness of the lens element.

Equation (13) is used to calculate a final dispersion $v_{01f}$ and $\delta$ is computed from an equation:

$$\delta=v_{01f}-v_{01} \quad (15)$$

Equation (9) indicates that chromatic aberration depends on change in dispersion in the material, but not on refractive index of the material. It is also clear from the equation that a small initial dispersion, combined with a large change in dispersion, results in small values of shape-factor in an achromatic singlet element. The equation also indicates that a positive change in dispersion is used to correct elements having a shape-factor less than 1.0, and a negative change in dispersion is preferably used to correct lens elements having a shape-factor greater than 1.0.

It should be noted here that a negative change in dispersion means that dispersion in the absolute sense is actually increasing, while a positive change in dispersion means that dispersion in the absolute sense is decreasing. This is because dispersion for most optical glasses, mathematically defined, is negative, i.e., refractive decreases with increasing wavelength.

It should be noted that while equation (9) is sufficiently accurate to define basic conditions for providing an achromatic singlet element, the value of X provided by the equation is only approximate. The value of X provided, however, is an adequate initial value for computer refinement. Accordingly, a more complex, closed form equation, which may provide a slightly more accurate definition of X, is not presented here. Computer refinement is now commonplace in the art to which the present invention pertains, and, indeed, was used to compute specifications and performance of achromatic GRIN singlet elements described below.

One preferred embodiment of an achromatic GRIN singlet lens element 98 is depicted in FIG. 16. Element 98 has first and second surfaces 100 and 102 arranged on a common optical axis 26. Element 98 is formed from an axially graded refractive index material having a dispersion increasing in a direction parallel to optical axis 26. It should be noted that the refractive gradient, here, is selected only to provide a desired dispersion gradient. As the color correction mechanism is independent of the absolute value of the refractive index, the refractive index gradient neither augments nor compromises the color correction process. It will be evident from descriptions given above, however, that the refractive gradient may affect one or more third order aberrations.

Continuing now with a specification of the element, the focal length is 100.0 mm and the diameter of the element is 5.0 mm. Initial dispersion $v_{01}$ is −0.0384; change in dispersion $\delta$ is −0.069; and lens shape-factor is 2.18.

Transverse ray aberration plots for element 98, at three wavelengths including the F and C lines, are depicted in FIGS. 17A–B. It can be seen that curves for the F and C lines are coincident, indicating an absence of axial chromatic aberration. By way of comparison, transverse ray aberration plots at the same three wavelengths for a homogeneous lens of the same shape-factor as element 98 are depicted in FIGS. 18A–B.

Figure 20:
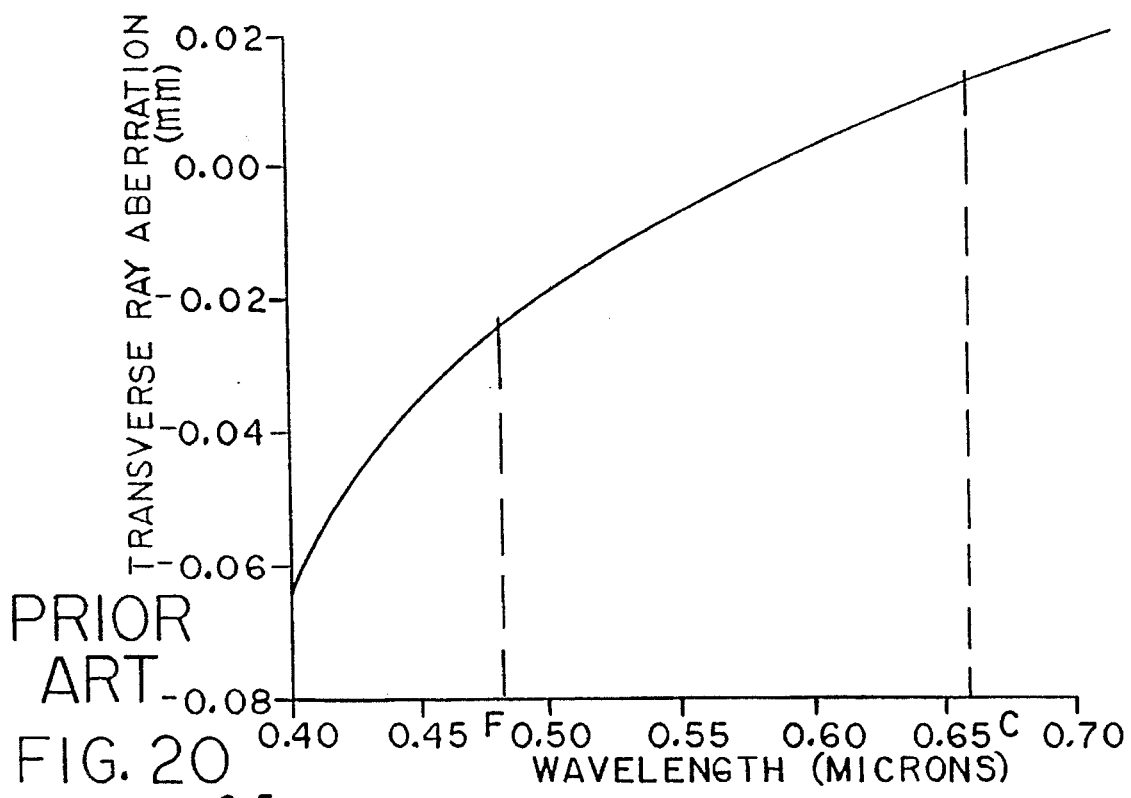
FIG. 20 is a graph schematically illustrating transverse ray aberration as a function of wavelength for a prior art homogeneous lens element having the same shape as the gradient dispersion singlet lens element of FIG. 16.

Transverse ray aberration versus wavelength for element 98 is depicted in FIG. 19. Equal aberration values at the hydrogen F and C wavelengths indicate absence of axial chromatic aberration. By way of comparison, transverse ray aberration versus wavelength for a homogeneous lens element having the same shape as element 98 is depicted in FIG. 20. Here, substantial chromatic aberration is evident.

Figure 21:
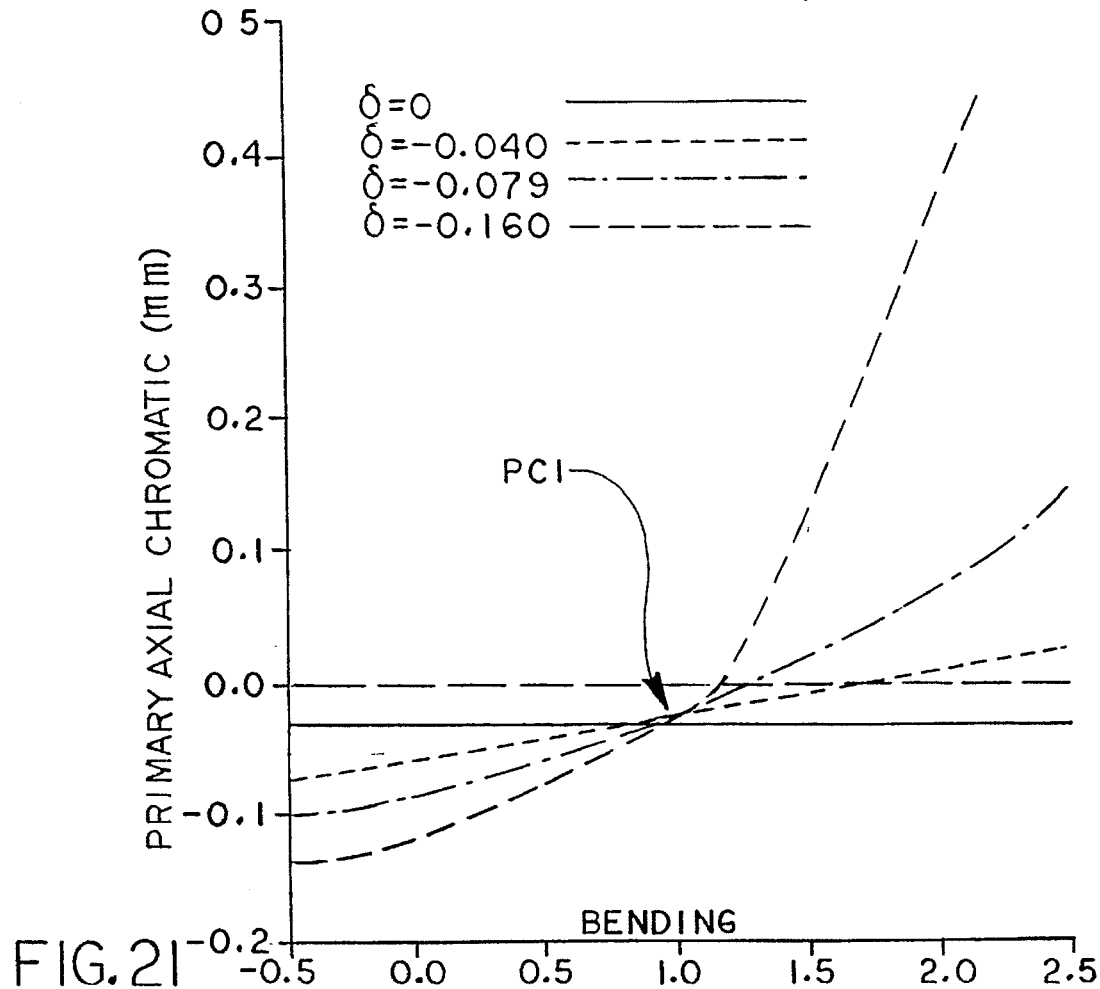
FIG. 21 is a graph schematically illustrating chromatic aberration versus shape-factor and dispersion change for gradient dispersion singlet lens elements in accordance with the present invention.

Finally, but not exhaustively, chromatic aberration as a function of shape-factors between −2.0 and 2.0 for various values of δ is shown in FIG. 21. It can be seen that here, as is the case for monochromatic aberrations discussed above, a pivot-point (designated PC1 in FIG. 21) exists at which chromatic aberration is invariant with dispersion change. Pivot-point PC1 exists at shape factor 1.0 which is predictable from equation (9).

The example presented above describes design of an achromatic singlet element using a linear dispersion gradient. Clearly, however, the possibility exists of using a quadratic or cubic gradient or some other non-linear gradient to achieve a comparable result. Such non-linear gradients may provide a means of locating the chromatic pivot-point at a selected shape factor in the same manner as which pivot-points for third order aberrations may be selectively located.

In summary, the performance of several unique axial refractive index gradient lens elements has been described. These elements include iso-aberrant elements in which at least one third order aberration is either zero or some substantially constant value at shape-factors between −2.0 and 2.0. Also included are pivot-point elements which are arranged such that a selected third order aberration is invariant with refractive index change. Non-linear and compound refractive index gradients are arranged such that only a relatively small index-change in an element is required to provide desired iso-aberrant properties. A dispersion gradient material is used to provide achromatic singlet lens elements.

Refractive index suitable for fabricating such elements, in sizes suitable for a wide range of lens and optical system applications, may be formulated using a proven layer fusion method. Refractive index changes required for elements in accordance with the present invention represent only a fraction of the biggest refractive index change available using that method. Accordingly, an optical system designer may select from a range of initial and final refractive index values, as well as index dispersion values if this is necessary to satisfy system correction requirements.

INDUSTRIAL APPLICATION

It is believed that elements in accordance with the present invention will encourage the use of gradient index material in optical system design.

Hitherto, gradient refractive index has been treated merely as an additional degree of freedom in a trial-and-error approach to system design, which, unfortunately, is encouraged by the power, speed and availability of modern computers.

The teachings of this disclosure, and elements fabricated according to those teachings, should permit a more logical and systematic approach to incorporating gradient index elements in an optical system design. Accordingly, elements in accordance with the present invention may afford significantly greater element count reduction or better performance than has been suggested in prior art system designs. It is anticipated that certain monochromatic systems, currently requiring two or more conventional optical elements, may be replaced with a single element in accordance with the present invention. Because of this, significant reduction in size and weight of optical systems is possible.

Further, because only a relatively small refractive index change is required for most elements in accordance with the present invention, the amount or complexity of gradient refractive index material required to form an element is significantly less than has been suggested for prior art gradient index optical systems. This should lower material cost, and encourage wider use of gradient index technology.

What is claimed is:

1. A lens element, comprising:

first and second surfaces formed on an optically transparent material having an axial refractive index gradient, said first and second surfaces arranged on a common optical axis;

said gradient refractive index having a highest value on said first surface and a lowest value on said second surface, and said gradient refractive index varying continuously throughout the lens element according to a predetermined non-linear function of distance measured in a direction parallel to said optical axis;

said gradient refractive index having an index-change defined by an equation $$\Delta n = n1 - nh$$

where nh is the highest value of said gradient refractive index and n1 is the lowest value of said gradient refractive index;

said first surface having a first radius of curvature and said second surface having a second radius of curvature, the lens element having a shape-factor defined as $$X = (R2 + R1)/(R2 - R1)$$

where X is said shape-factor, R1 is said first radius of curvature, and R2 is said second radius of curvature;

said shape factor having any value between about 0.5 and 2.0; and said index-change being between about −0.4 and −0.15, and said predetermined non-linear function selected such that third order spherical aberration of the lens element is substantially corrected.

2. The lens element of claim 1, wherein said predetermined non-linear function is a polynomial function including finite linear, quadratic, and cubic coefficients.

3. The lens element of claim 2, wherein said index change is about −0.2.

4. A lens element, comprising:

first and second surfaces formed on an optically transparent material having an axial refractive index gradient, said first and second surfaces arranged on a common optical axis;

said gradient refractive index having a lowest value on said first surface and a highest value on said second surface and said gradient refractive index varying continuously throughout the lens element according to a predetermined non-linear function of distance measured in a direction parallel to said optical axis;

said gradient refractive index having an index-change defined by an equation $$\Delta n = nh - n1$$

where nh is the highest value of said gradient refractive index and nl is the lowest value of said gradient refractive index;

said first surface having a first radius of curvature and said second surface having a second radius of curvature, the lens element having a shape-factor defined as $$X=(R2+R1)/(R2-R1)$$

where X is said shape-factor, R1 is said first radius of curvature, and R2 is said second radius of curvature;

said shape factor having any value between about −2.0 and −0.5; and said index-change having a value of about 0.4 and said predetermined non-linear function selected such that third order spherical aberration of the lens element is substantially corrected.

5. The lens element of claim 4, wherein said predetermined non-linear function is a polynomial function including finite linear, quadratic, and cubic coefficients.

6. A lens element, comprising:

first and second surfaces formed on a transparent gradient dispersion material, said first and second surfaces arranged on a common optical axis normal to said surfaces;

said gradient dispersion material having a dispersion gradient characterized by a dispersion varying continuously in a direction parallel to said optical axis and having a highest value at one of said surfaces and a lowest value at the other said surfaces;

said first surface having a first curvature and said second surface having a second curvature, the lens element having a shape-factor defined as $$X=(R2+R1)/(R2-R1)$$

where X is said shape-factor, R1 is said first radius of curvature, and R2 is said second radius of curvature;

said shape-factor providing a first axial chromatic aberration for red and blue light passing through the lens element, and said dispersion gradient providing a second axial chromatic aberration for red and blue light passing through the lens element; and wherein said shape-factor and said dispersion gradient are selected such that said first and second chromatic aberrations of the lens element for red and blue light are about equal in magnitude and opposite in sign.

7. The lens element of claim 6, wherein said shape-factor has a value greater than 1.0 and said dispersion increases with distance measured in a direction parallel to said optical axis.

8. The lens element of claim 6, wherein said shape-factor has a value less than 1.0 and said dispersion decreases with distance measured in a direction parallel to said optical axis.

9. A lens element, comprising:

first and second surfaces formed on a transparent material having a gradient refractive index, said first and second surfaces arranged on a common optical axis and said gradient refractive index varying continuously throughout the lens element according to a non-linear function of distance measured in a direction parallel to said optical axis;

said first surface having a first radius of curvature and said second surface has a second radius of curvature, the lens element having a shape-factor defined as $$X=(R2+R1)/(R2-R1)$$

where X is said shape-factor, R1 is said first radius of curvature, and R2 is said second radius of curvature;

said shape factor having any value between about −2.0 and 2.0; and said non-linear gradient-index function selected such that at least one third order aberration of the lens element selected from the group consisting of spherical, coma, and astigmatism is substantially corrected.

10. The lens element of claim 9, wherein:

said gradient refractive index has an index-change defined by an equation $$\Delta n = n_1 - n_h$$

where $n_h$ is the highest value of said gradient refractive index and $n_1$ is the lowest value of said gradient refractive index; and said shape-factor has a value between about 0.0 and 2.0 and said index-change has a value between about −0.25 and −0.02.

* * * * *